United States Patent
Folino et al.

(10) Patent No.: US 6,968,756 B2
(45) Date of Patent: Nov. 29, 2005

(54) MULTI-SPEED RATIO APPARATUS TO CONTROL SHAFT OUTPUT

(75) Inventors: Frank A. Folino, Salem, MA (US); John M. McClelland, Lowell, MA (US)

(73) Assignee: Synkinetics, Inc., Framingham, MA (US)

( * ) Notice: Subject to any disclaimer, the term of this patent is extended or adjusted under 35 U.S.C. 154(b) by 0 days.

(21) Appl. No.: 10/687,082

(22) Filed: Oct. 16, 2003

(65) Prior Publication Data

US 2004/0127322 A1 Jul. 1, 2004

Related U.S. Application Data

(60) Provisional application No. 60/450,216, filed on Feb. 25, 2003, and provisional application No. 60/418,825, filed on Oct. 16, 2002.

(51) Int. Cl.[7] ............................................. F16H 48/20
(52) U.S. Cl. ........................ 74/745; 74/650; 475/183
(58) Field of Search ........................... 74/63, 650, 745; 475/168, 183, 196; 476/18, 36

(56) References Cited

U.S. PATENT DOCUMENTS

| | | | |
|---|---|---|---|
| 5,312,306 A | 5/1994 | Folino | |
| 5,533,424 A | 7/1996 | Mimura | |
| 5,562,564 A * | 10/1996 | Folino | ........................ 476/36 |
| 5,577,423 A | 11/1996 | Mimura | |
| 5,607,370 A | 3/1997 | Maslow et al. | |
| 5,954,615 A * | 9/1999 | Folino | .......................... 476/36 |
| 5,989,145 A | 11/1999 | Bursal et al. | |
| 6,039,672 A | 3/2000 | Bursal | ........................ 476/36 |
| 6,068,573 A | 5/2000 | Folino et al. | .................. 476/36 |
| 6,125,711 A * | 10/2000 | Bursal et al. | ................... 74/63 |
| 6,186,922 B1 | 2/2001 | Bursal et al. | ................. 476/18 |
| 6,270,442 B1 * | 8/2001 | Folino et al. | ................. 476/18 |
| 6,314,826 B1 * | 11/2001 | Cunningham et al. | ...... 475/168 |
| 6,383,110 B1 | 5/2002 | Bursal | ........................ 475/196 |

FOREIGN PATENT DOCUMENTS

| | | | |
|---|---|---|---|
| WO | WO 94/18472 | * | 8/1994 |
| WO | WO 94/29617 | * | 12/1994 |

* cited by examiner

*Primary Examiner*—Ha Ho
(74) *Attorney, Agent, or Firm*—Perkins Smith & Cohen LLP; Jacob N. Erlich; Peter J. Borghetti

(57) ABSTRACT

A multi-speed ratio apparatus to control output for use, but not limited to, either as a module connected to a transmission or as a stand alone transmission. The multi-speed ratio apparatus is connected to a driving member (such as, for example, an engine, motor, or transmission) and a driven member (such as a shaft, differential, or axle). The apparatus having at least one rotary speed converter, the rotary speed converter having a conjugate pair of cam parts and a reaction disk interconnected between the conjugate pair of cam parts. The reaction disk is capable of operably coupling the conjugate pair of cam parts. Further the apparatus includes a grounding member.

41 Claims, 22 Drawing Sheets

MULTI-SPEED RATIO APPARATUS TO CONTROL SHAFT OUTPUT

CROSS REFERENCE TO RELATED APPLICATIONS

This application claims the benefit of Provisional Application No. 60/418,825, entitled COMPUTER CONTROLLED MULTI-RATIO TRANSMISSION filed on Oct. 16, 2002, and Provisional Application No. 60/450,216, entitled COMPUTER CONTROLLED MULTI-RATIO TRANSMISSION filed on Feb. 25, 2003, which are both incorporated herein by reference.

BACKGROUND OF THE INVENTION

The conversion of motor or engine output power into required output torque and speed for vehicular motivation is accomplished by a transmission that usually includes some arrangement of gears and/or belt drives. Further, these elements are so arranged as to change speed and torque at fixed ratios such that transmissions are referred to by the number of fixed ratios they are capable of providing in the forward driving direction. The average automotive transmission has 4 speeds but there are also 5, 6 and 7 speed automotive transmissions and up to 32 speeds or more for truck transmissions. Other configurations of transmissions are applicable for specialty vehicles, off-road vehicles and equipment, agricultural vehicles and equipment, and marine vessels. The ability to change from one ratio to another ratio can be fully manual, automated manual, semi-automatic, or automatic. The ratios are designed to provide the appropriate torque and speed for the desired acceleration and velocity of the vehicle. So that, a first ratio of an automobile will provide high torque at a low vehicle velocity as would be required when starting from rest. The high torque is necessary to accelerate the vehicle from rest. As the vehicle increases in velocity, a second speed ratio would be required to provide more speed to the driving wheels to continue the acceleration to a higher vehicle velocity. The amount of torque required diminishes as the vehicle velocity increases as the torque requirement is significantly less to sustain a moving mass. A third, fourth, and so on ratio continue the process to achieve the desired vehicle velocity. The same is true for trucks but with many more ratios required due to the substantially greater mass of the vehicle and payload. The specific ratios, the incremental ratio steps between ratios, the ratio range (lowest gear/highest gear), the shift quality from one ratio to another ratio, the efficiency of the transmission and the cost are all factors for consideration when advancing conventional transmission technology.

The transition of changing from one ratio to another ratio in truck transmissions is operator intensive due to the large number of necessary ratios. The total mass of the vehicle including its payload requires the operator to be very active at changing ratios, particularly from rest up to some intermediate vehicle velocity. Often several ratio changes are required from rest to only 10 mile per hour (mph) vehicle velocity. The demand on the motor or engine for steep grades, both uphill and downhill requires transmissions with a large number of ratios to meet these demanding conditions for trucks. The greater the number of ratios available the more ratio selection options the operator has available to match vehicle velocity and desired acceleration to the road and load conditions. Unfortunately, the greater the number of ratios in a transmission, the more complex it is, the larger and heavier it is, and the more expensive it is.

It is desirable to advance transmission technology to deliver overall vehicle improved fuel efficiency which correlates to a reduction in engine emissions, reduce the actual cost of manufacturing and maintaining a transmission, and provide the desired overall vehicle performance including but not limited to: launch acceleration, shift quality, cruise, passing, hill climb and descent.

SUMMARY OF INVENTION

The present invention is a multi-speed ratio apparatus for use either as a module operably connected to an existing conventional transmission or as a stand-alone transmission replacing a conventional transmission. The present invention is operably connected to a driving member (such as an engine or motor or transmission), and a driven member (such as shafts, differentials, or axles). Further, the compactness of the present invention enables integration of the present invention with an existing conventional rotary device, such as a differential, without significant increase in size, if any, of the primary housing of the conventional rotary device. The present invention satisfies the primary objectives set forth above by providing multiple speed ratios that engage at relatively small incremental steps between ratios with a greater ratio range. The present invention provides the desired vehicle performance such as, but not limited to, launch acceleration, shift quality, cruise, passing, hill climb and descent.

The present invention may include the following components, but is not necessarily limited to, a housing containing at least one single stage rotary speed converter having a conjugate pair of cam parts and a reaction disk between the conjugate pair of cam parts. The conjugate pair of cam parts include an inner cam with a shaft and an outer cam. The reaction disk includes a shaft and slots with contact members selectively disposed within the slots. The contact members may include rollers, bearings, and/or roller devices. In this invention, bearing(s) are being used in their generic sense, that is, indicating a rolling motion device or component, such as a roller bearing, ball, etc., and these terms will be used interchangeably through the specification and claims. Alternative embodiments of the invention may include a lesser or greater amount of components and the reaction disk may include other contact member retention features other than slots to perform the same function. The reaction disk is capable of operably coupling the conjugate pair of cam parts. Further, the present invention includes a grounding member operably connected to, for example, the outer cam capable of selectively grounding, for example, the outer cam to, for example, the housing, thereby selecting a speed ratio. However, any of the rotatable components of the rotary speed converter can be grounded for the same desired multi-speed ratio results. Likewise, the grounding element can be any stationary structure that performs the same function of the housing in the rotatable component grounding operation.

The shafts of the inner cam and the slotted reaction disk act as either the speed/torque input or output of the present invention depending on the particular configuration. In one embodiment, the inner cam acts as the input part to the present invention being operably connected to the driving member and the slotted reaction disk acts as the output part to the present invention being operably connected to the driven member. In another embodiment, the slotted reaction disk acts as the input part to the present invention being operably connected to the driving member and the inner cam acts as the output part to the present invention being operably connected to the driven member. Yet another embodiment of the present invention includes the outer cam as either the input or the output of the present invention.

Further, the components of the rotary converter may be configured in a nested configuration or the like.

The single stage rotary converters can be aligned in series, for example, to form multi-stage embodiments. In multi-stage embodiments having at least two inner cams, the inner cams can act as both the input and the output of the present invention. Likewise, in multi-stage configurations having at least two reaction disks, one reaction disk can act as the input part and the other reaction disk can act as the output part of the present invention.

The number of speed ratios producible by the present invention is a function of the number of conjugate pairs of cam parts, cams lobes, and contact members. The speed ratios greater than 1 are speed reducer ratios and the speed ratios less than 1 are speed increaser ratios. There is a reverse speed in the present invention configured as a transmission.

For a better understanding of the present invention, together with other and further objects thereof, reference is made to the accompanying drawings and detailed description and its scope will be pointed out in the appended claims.

BREIF DESCRIPTION OF THE DRAWINGS

DETAILED DESCRIPTION OF THE PREFERRED EMBODIMENTS

Figure 1A:
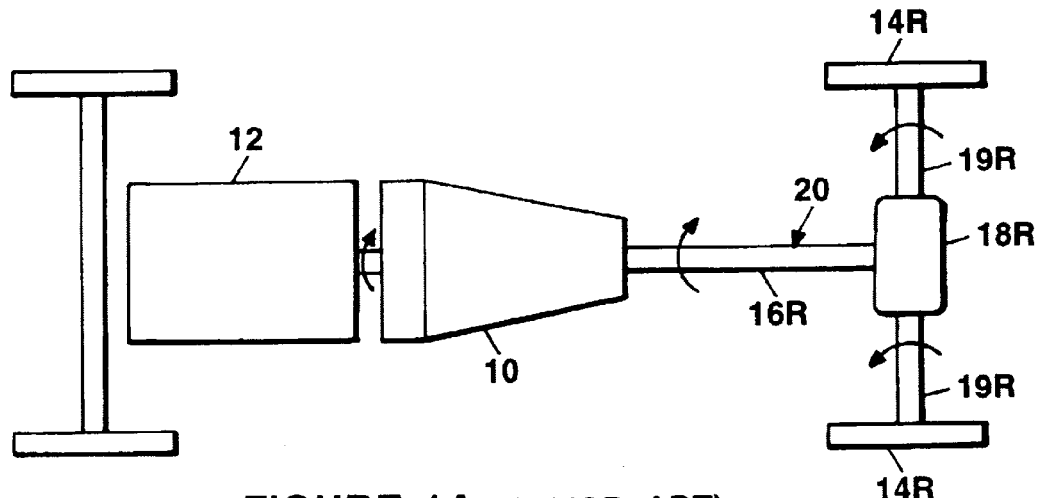
FIG. 1A is a schematic view of the prior art of a rear wheel drive train.
Figure 1B:
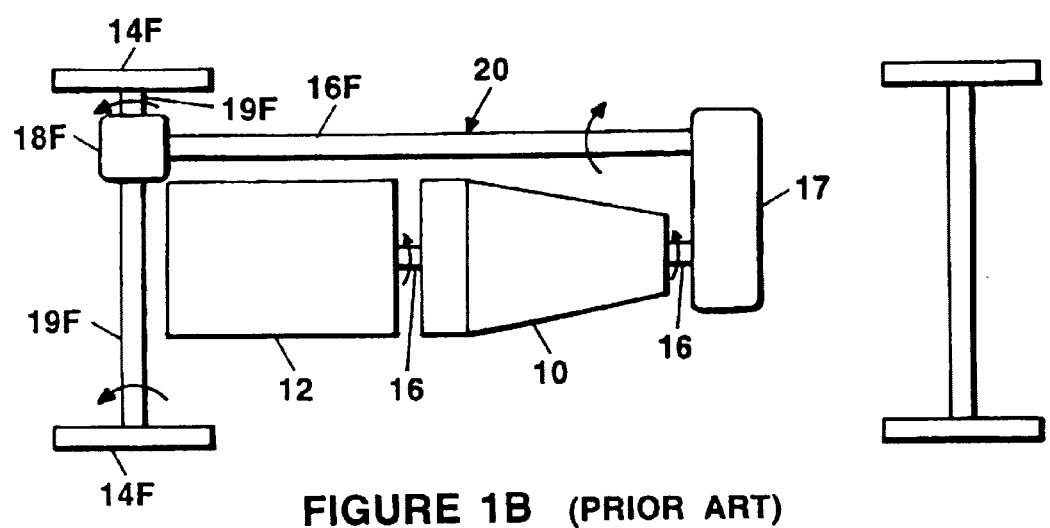
FIG. 1B is a schematic view of the prior art of a front wheel drive train.
Figure 1C:
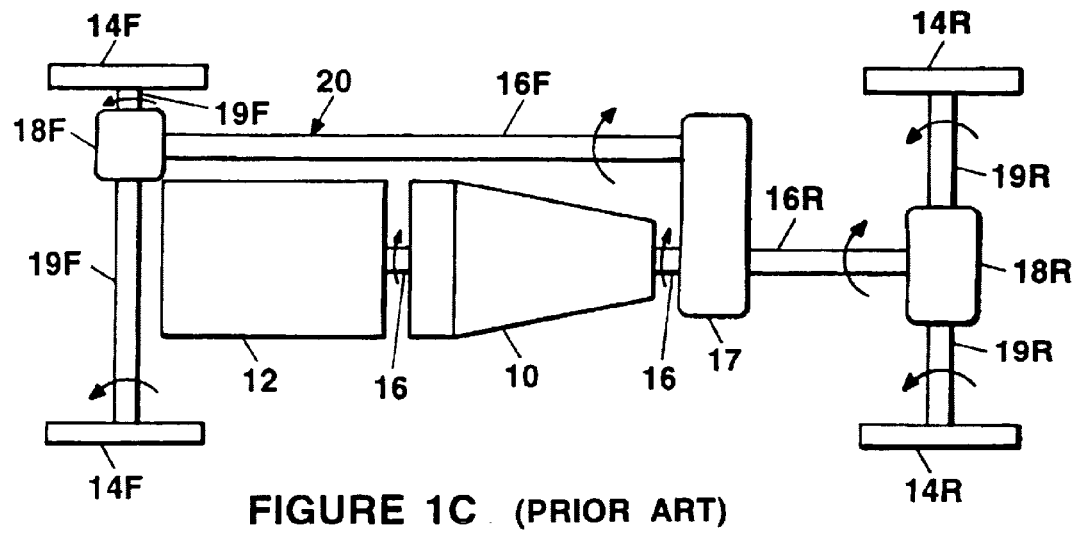
FIG. 1C is a schematic view of the prior art of an all wheel drive train.

As illustrated in FIGS. 1A–1C, conventional transmissions 10 for rear-wheel (FIG. 1A), front-wheel (FIG. 1B) and all-wheel (FIG. 1C) drive vehicles operably connect the engine or motor (hereinafter referred to as driving members 12) with the wheels 14 through a series of operably connected shafts 16, differentials 18, and driving axles 19 (collectively hereinafter referred to as driven members 20), and control the rotational speed of the driven members 20 with respect to the driving member rotational shaft speed output. Further the forward wheel (FIG. 1B) and all wheel (FIG. 1C) drive trains include a transfer case 17. The "F" and "R" terms following the reference numbers of FIGS. 1A–C refer to Front ("F") and Rear ("R") components of the drive train.

Figure 2A:
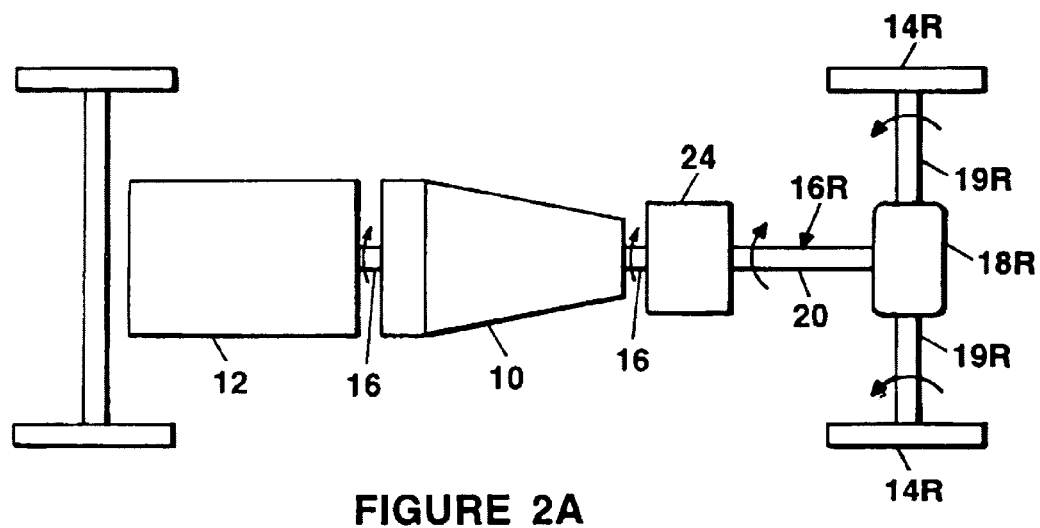
FIG. 2A is a schematic view of a module embodiment of the present invention operably connected to a conventional rear wheel drive transmission.
Figure 2B:
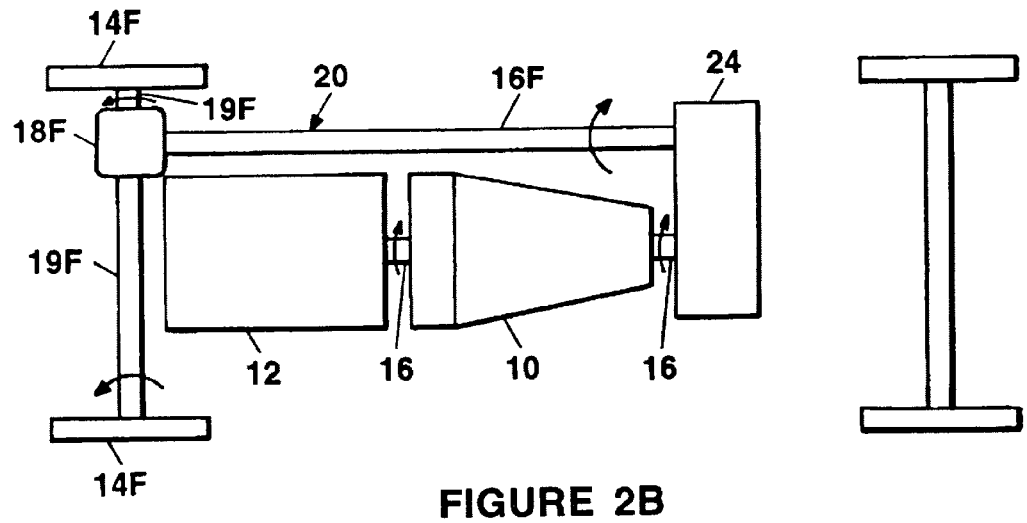
FIG. 2B is a schematic view of a module embodiment of the present invention operably connected to a conventional front wheel drive transmission.
Figure 2C:
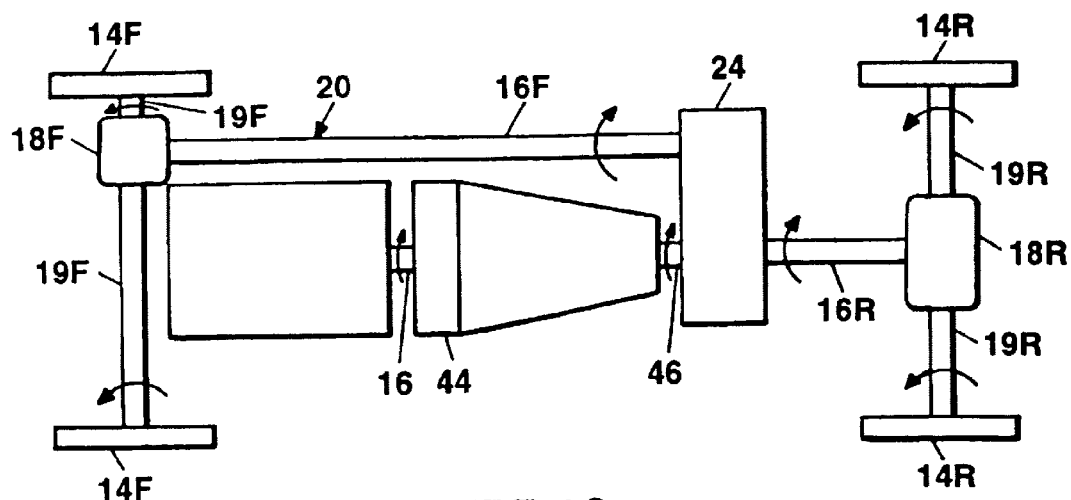
FIG. 2C is a schematic view of a module embodiment of the present invention operably connected to a conventional all wheel drive transmission.
Figure 3A:
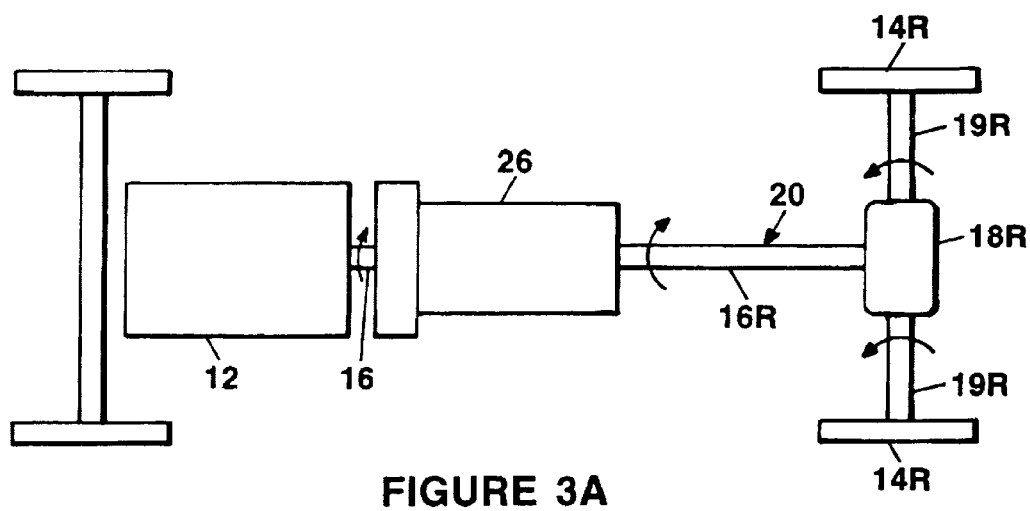
FIG. 3A is a schematic view of an embodiment of the present invention as a rear wheel drive transmission.
Figure 3B:
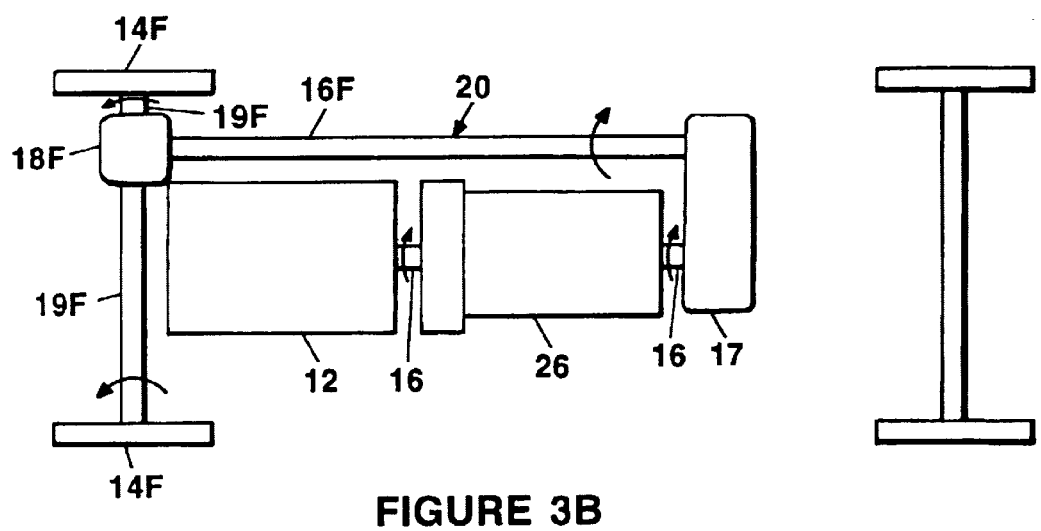
FIG. 3B is a schematic view of an embodiment of the present invention as a front wheel drive transmission.
Figure 3C:
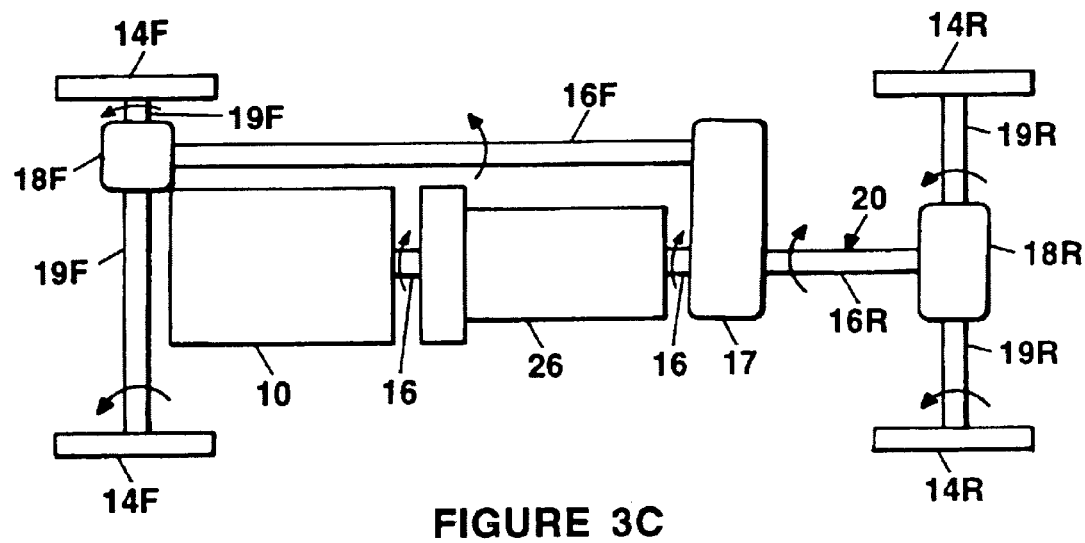
FIG. 3C is a schematic view of an embodiment of the present invention as an all wheel drive transmission.
Figure 4A:
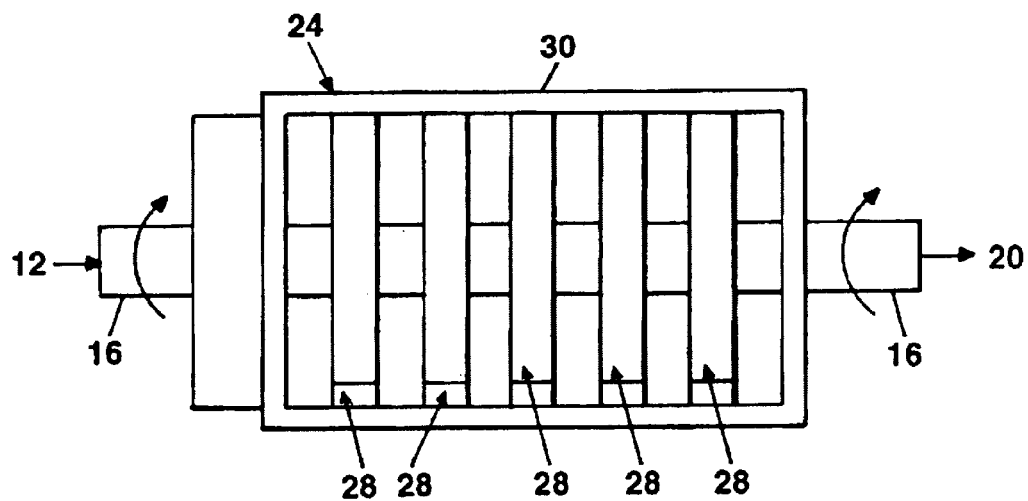
FIG. 4A is a sectional view of an exemplary module embodiment of FIG. 2A.
Figure 4C:
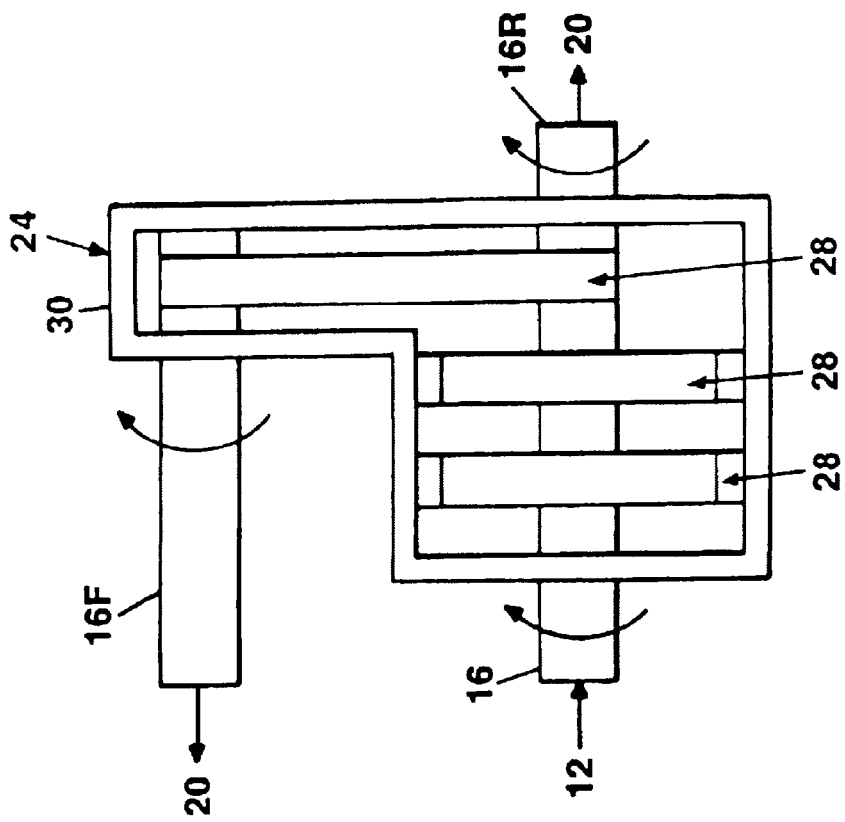
FIG. 4C is a schematic, sectional view of an exemplary module embodiment of FIG. 2C.
Figure 4B:
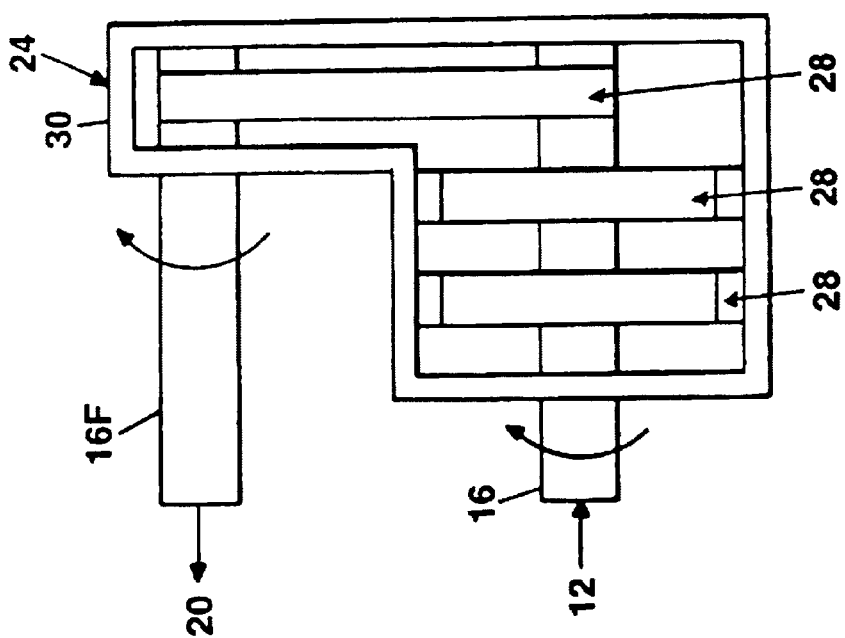
FIG. 4B is a schematic, sectional view of an exemplary module embodiment of FIG. 2B.
Figure 5A:
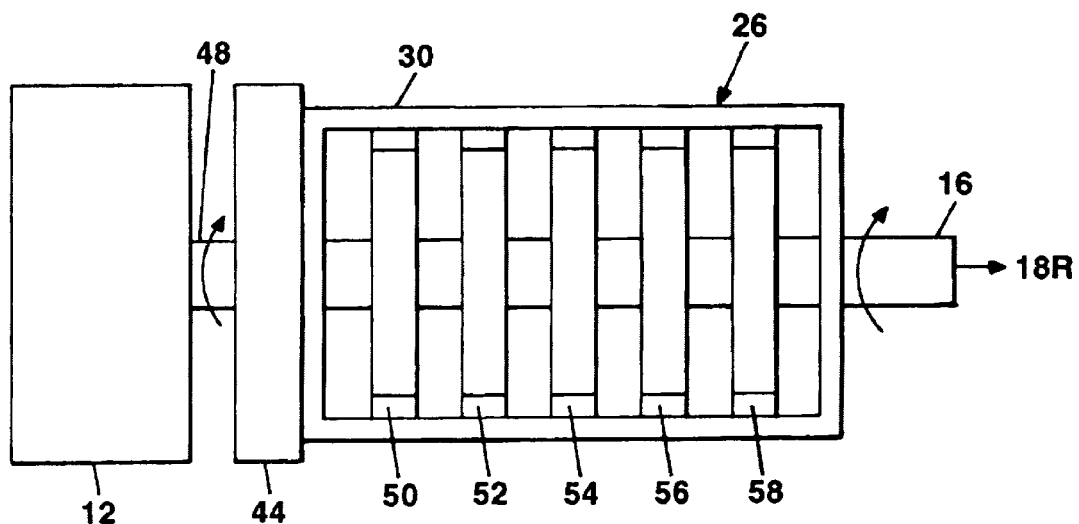
FIG. 5A is a schematic, sectional view of an exemplary transmission embodiment of FIG. 3A.
Figure 5B:
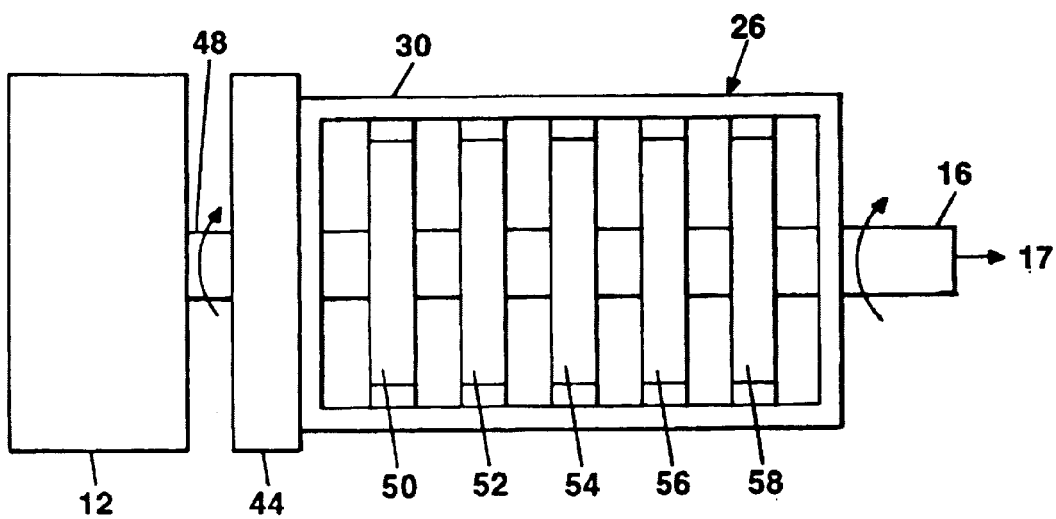
FIG. 5B is a schematic, sectional view of an exemplary transmission embodiment of FIGS. 3B and 3C.
Figure 6:
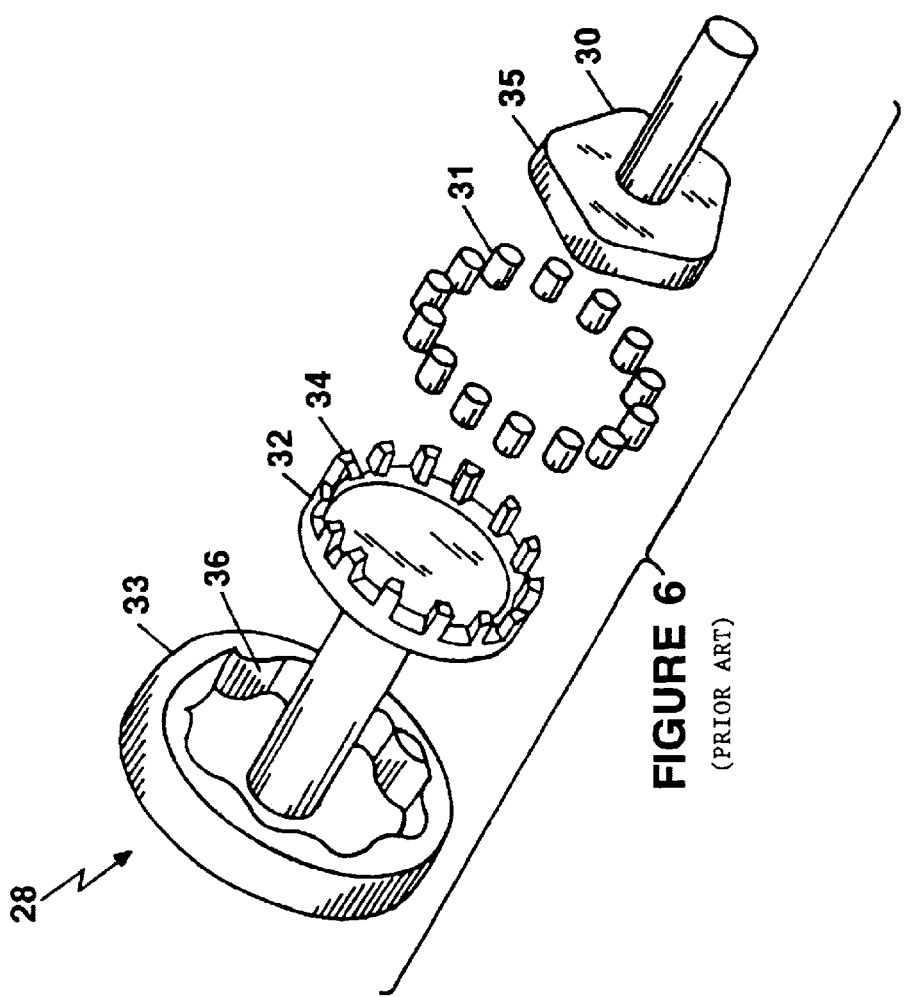
FIG. 6 is an exploded view of a single stage speed converter of the prior art utilized with the present invention.

The present invention in its various embodiments is either operably connected to the driving member 12 either as a module 24 disposed between and operably connected to the conventional transmission 10 and the driven members 20 (FIGS. 2A, 2B, 2C), or as a stand alone transmission 26 (FIGS. 3A–3C) being disposed between the driving member and the driven members 20. FIGS. 4A–4C (module embodiments for each drive train) and 5A–5B (transmission embodiment for all drive trains) are sectional views of the various embodiments described above illustrating the arrangement of one or more single stage speed converter(s) within the housing 30 (FIG. 6). The reference number for the single stage speed converter is 28 in all the figures except for FIGS. 5A–B, which uses reference numbers 50, 52, 54, 56, and 58 to distinguish the single stage speed converter as stages 1 thru 4 and reverse (discussed in detail below). The "F" and "R" terms following the reference numbers of FIGS. 1A–C, 2A–C, and 3A–3C refer to Front ("F") and Rear ("R") components of the drive train.

The present invention either as a module 24 or a transmission 26 is a speed conversion, power transmission device. The present invention includes one of more single stage speed converter(s) 28 preferably of the type described in U.S. Pat. Nos. 6,383,110; 6,314,826; 6,186,922; 6,068,573 and 6,039,672, all incorporated herein by reference, and all assigned to Synkinetics, Inc. Each single stage speed converter 28 provides a speed reduction function, a speed increasing function, and a 1:1 coupling function. The single stage speed converter 28 can function as a back drivable or non-back drivable speed conversion device. Back drivable means the input path can be reversed, and for example the once output part is now the input member and the once input part is now the output member. Further, the single stage speed converter 28 can provide a speed conversion ratio and a counter rotating output thereby functioning as a reversing ratio stage.

Figure 7:
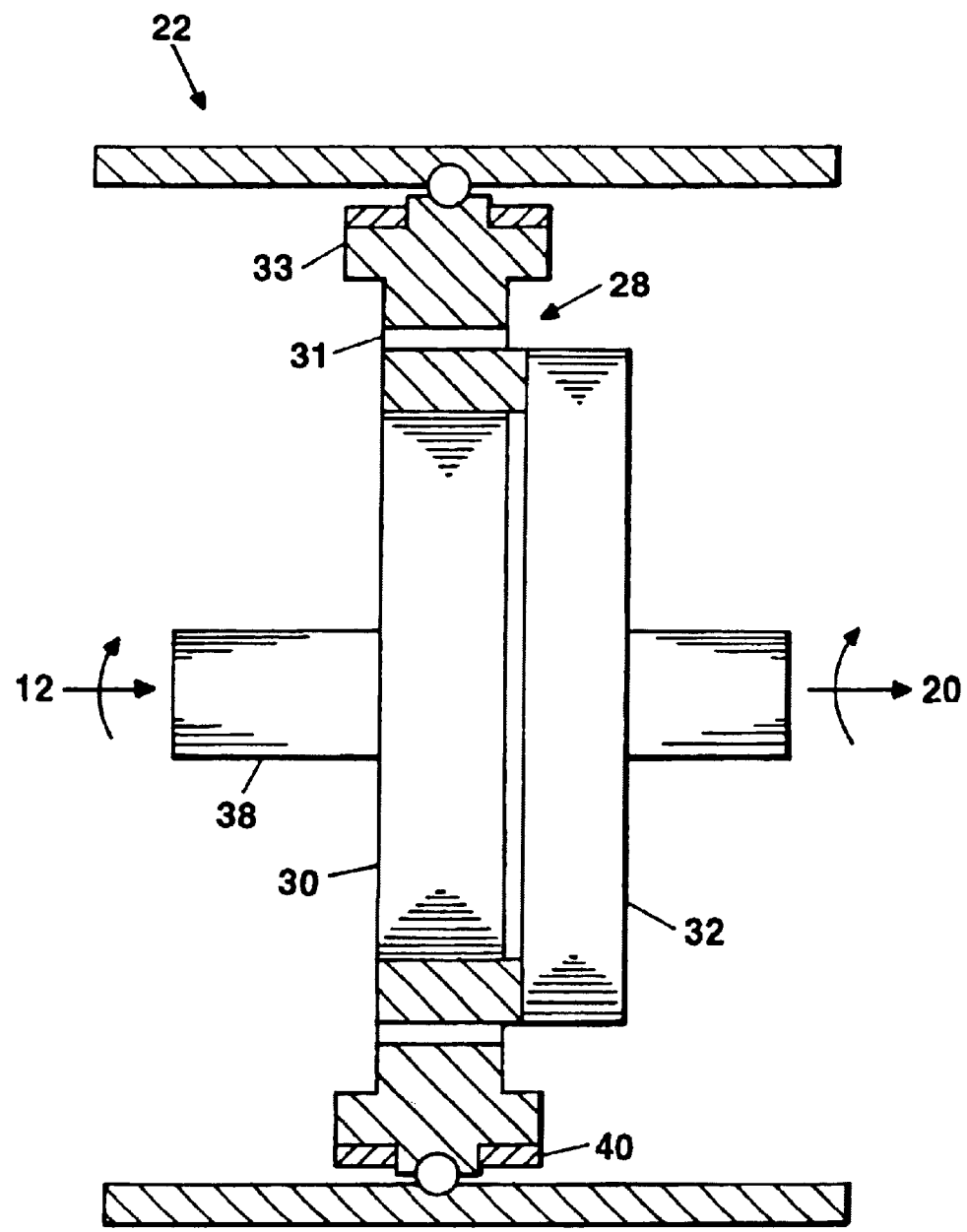
FIG. 7 is a sectional view of the single stage speed converter of the type shown in FIG. 6 illustrating the inner cam as the input part and the reaction disk as the output part as utilized in the present invention.

As taught in the above-referenced U.S. patents which have been incorporated herein by reference, the normal kinematic elements of each single stage speed converter 28 (which may be considered to be of a nested configuration) of FIG. 6 and as illustrated in FIG. 7 include an input member (for example, inner cam 30), a groundable member (for example, the outer cam 33), and an output member (for example the reaction disk 32). The inner cam 30, acting as the input, that displaces the contact members 31 (for example rollers or roller device or bearings) outwardly which, in turn, interacts with the flanks 36 33. The contact members 31 (for example rollers) interact between the cam surfaces of the inner cam 30 and outer cam 33 kinematically producing a reactive tangential force in the slots 34 of the reaction disk 32 that produces a torque on the output shaft of the reaction disk 32 that is proportional to a predetermined speed reduction. In this case, the speed conversion ratio is equal to the number of contact members (rollers 31) or slots 34 in the reaction disk 32, to the number of lobes 35 on the inner cam 30. The number of lobes 35, for example 5, on the inner cam 30, divided by the number of rollers 31, for example 14, in the slots 34 of the reaction disk 32, is equal to a speed conversion ratio, in this embodiment, of 5/14 or a speed reduction 5/14 of a revolution of the output reaction disk 32, for one revolution of the inner cam 30. There are five additional speed ratios for the single stage speed converter 28 illustrated in FIG. 6 and illustrated in Table 1.

As stated above, the kinematics of each speed converter 28 (also referred to as a single stage converter) incorporates a rotating input device, a rotating output device, and a grounded device to produce a reactive force. It is possible for any of these elements in a single stage speed converter 28 to be either a rotating device or a grounded device. Accordingly, it is possible to have six different configurations of the same single stage speed converter 28 by merely interchanging the functionality of each of the three elements in the single stage speed converter 28. The result of this interchangeability for the single stage speed converter 28 in FIG. 6, which has an inner cam 30 with, for example, (5) lobes 35, an outer cam 33 with, for example, (9) lobes 36, and a reaction disk 32 with, for example, (14) slots 34, and (14) rollers 31 is illustrated in Table 1 (below).

TABLE 1

| Ratio # | Input Element | Input Rotation | Output Element | Output Rotation | Grounded Element | Speed Ratio |
|---|---|---|---|---|---|---|
| 1 | Inner Cam | CW | Reaction Disk | CW | Outer Cam | 14/5 = 2.8:1 |
| 2 | Inner Cam | CW | Outer Cam | CCW | Reaction Disk | 9/5 = 1.8:1 |
| 3 | Outer Cam | CW | Reaction Disk | CW | Inner Cam | 14/9 = 1.56:1 |
| 4 | Reaction Disk | CW | Outer Cam | CW | Inner Cam | 9/14 = 0.64:1 |
| 5 | Outer Cam | CW | Inner Cam | CCW | Reaction Disk | 5/9 = 0.56:1 |
| 6 | Reaction Disk | CW | Inner Cam | CW | Outer Cam | 5/14 = 0.36:1 |

In accordance with Table 1, Ratio Nos. 1, 3, 4 & 6 with a clockwise rotation input, a clockwise rotation output is produced. Ratio Nos. 2 and 5 produces a counter-clockwise output rotation for the same clockwise input rotation. The clockwise rotational outputs are used as forward driving ratios and the counter clockwise rotational outputs are used as reverse driving ratios for a vehicle transmission.

The speed conversion ratios above 1:1 are speed reduction ratios and those below 1:1 are speed increasing ratios. For example, an input speed of 1000 RPM to an single stage speed converter 28 with a speed conversion ratio of 2.8:1 will output (1000/2.8)=357 RPM. While the same 1000 RPM input to an single stage speed converter 28 with a speed conversion ratio 0.64:1 will output (1000/0.64)=1563 RPM.

Another example of an embodiment of the present invention similar to FIG. 6 is the outer cam 33 having (4) lobes, the inner cam 30 having (10) lobes, the reaction disk 38 having (14) slots 34, and (14) rollers 31, then the speed conversion ratio SR=10/14=0.714:1, or a speed increased output equal to input speed divided by 0.714. In order for the single stage speed converter 28 to deliver torque at the described 1:1 condition, the single stage speed converter 28 is designed to specifically be non-back drivable.

Illustrated in FIG. 7 is a single stage speed converter 28 being capable of delivering (2) speed ratios. In this embodiment, the single stage speed converter 28 has an input shaft 38 which is integral with the inner cam 30 delivering the input speed to the present invention 22 which produces the output of the reaction disk 32 output at a 1:1 ratio when the outer cam 33 is free to rotate (not grounded). When the outer cam 33 is grounded via some grounding mechanism 40 (for example a clutch or braking), the single stage speed converter 28 is engaged or active thereby producing an output speed at the reaction disk 32 operably connected to the driven member 20 that is at a different speed from the input shaft 38 and the inner cam 30, which is operably connected to the driving member 12. The speed conversion ratio is specifically the active ratio of that single stage speed converter 28 configuration. In this embodiment, the speed conversion ratio is determined by the formula as follows:

$$\text{Speed ratio } SR = \frac{\text{\# of lobes on the output element}}{\text{\# of lobes on the input element}}$$

Where:

input element is the inner cam 30 output element is the reaction disk 32

Figure 8:
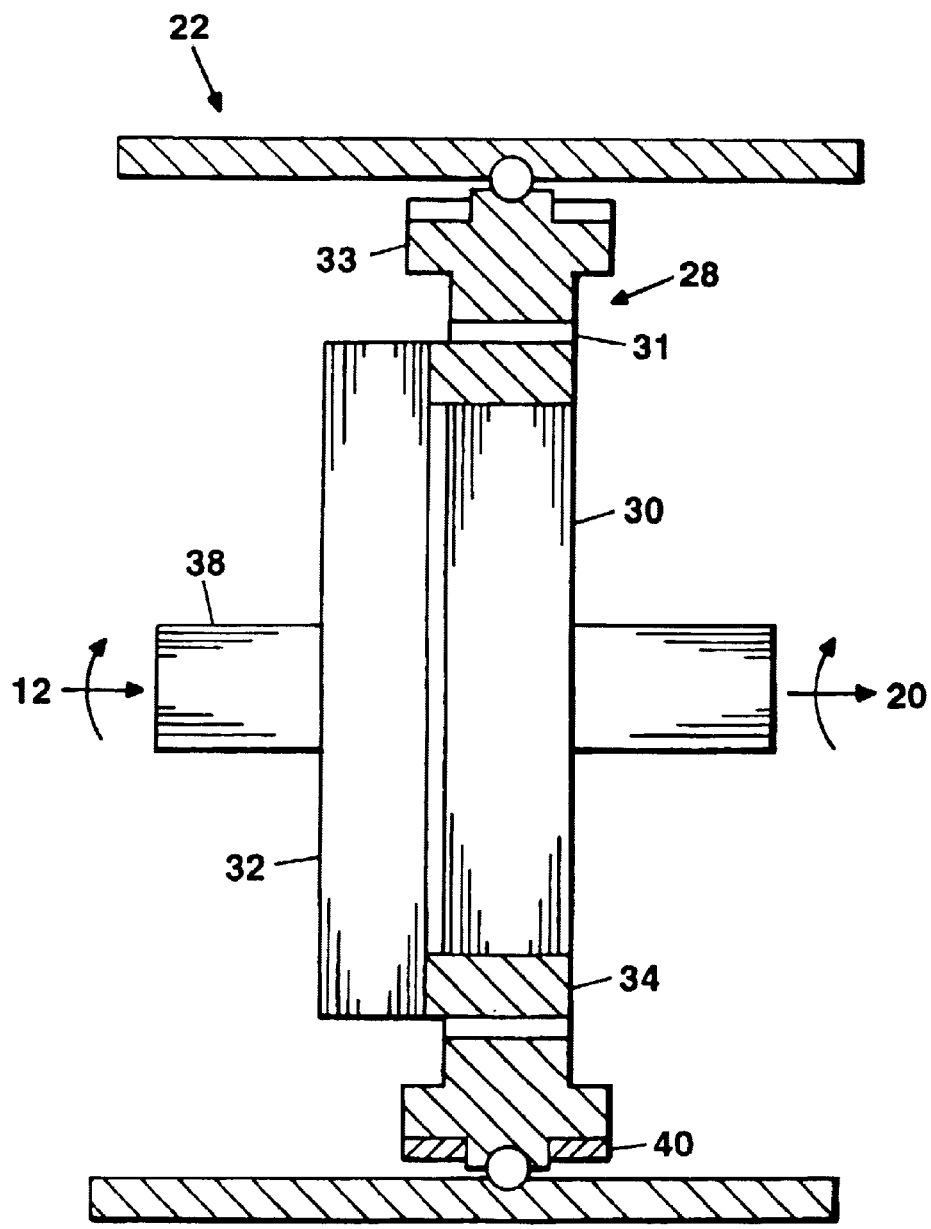
FIG. 8 is a sectional view of the single stage speed converter of the type shown in FIG. 6 illustrating the reaction disk as the input part and the inner cam as the output part as utilized in the present invention.

For the embodiment shown in FIG. 8, the outer cam 33 has (4) lobes, the inner cam 30 has (10) lobes, the reaction disk 32 has (14) slots 34, and (14) rollers 31. The speed conversion ratio SR=14/10=1.4:1, or a speed reduction of input speed divided by 1.4 equals the output speed. In order for the single stage speed converter 28 to deliver torque at the described 1:1 condition, the single stage speed converter 28 is designed to specifically be non-back drivable. The single stage speed converter 28 that is non-back drivable behaves as a 1:1 coupling when none of the elements being grounded. Ratios that are considered back drivable behave as a 1:1 coupling when two of the elements are grounded. It should also be noted that varying the lobes, slots and/or rollers, although not shown, are considered part of the present invention.

In FIG. 8, the present invention 22 is capable of delivering (2) speed ratios. In this embodiment, the single stage speed converter 28 has an input shaft 38, which is integral to the reaction disk 32, that delivers the input speed to the present invention 22, thereby producing output at the inner cam 30 at a 1:1 ratio when the outer cam 33 is free to rotate (not grounded). When the outer cam 33 is grounded via a grounding mechanism 40 (for example a clutch or a brake), the single stage speed converter 28 is engaged or active thereby producing an output speed at the inner cam 30, which is operably connected to the driven members 20, that is at a different speed from the input speed of the input shaft 30 and reaction disk 32, which is operably connected to the driving member 12. The speed conversion ratio is specifically the active ratio of that single stage speed converter 28 configuration. In this embodiment, the speed conversion ratio is determined by the formula as follows:

$$\text{Speed ratio } SR = \frac{\text{\# of lobes on the output element}}{\text{\# of lobes on the input element}}$$

Where:

input element is the reaction disk 32 output element is the inner cam 30

The total rotational speed conversion ratio outputs from the present invention 22 is determined by the product of the active ratio of each multi-single stage speed converter 28. This output can now become the input to the shafts 16 and the differential 18 of the driving axles 19. As previously described the output of the transmission 10 may be coupled to a differential 18, which in turn is operably connected to the driving axles 19 of the driving wheels 14. The differential 19 performs the function of accommodating different speed rotations of the drive wheels 14, as for example, going around corners. In the case of front wheel drive vehicles, it may be most beneficial if the differential can be integrated into the transmission in a similar fashion (described in detail below).

FIGS. 7 and 8 illustrate the inner cam 30 and reaction disk 32 being interchangeable as an input and output part. FIG. 7 shows the inner cam 30 as an input part and the reaction disk being an output part. Whereas, FIG. 8 shows the reaction disk 32 as an input part and the inner cam as an output part. Though the outer cam is shown in FIGS. 7 and 8 as a grounded part, other alternative embodiments (not shown) of the present invention configure the outer cam as an input and output part in a similar manner as disclosed above and illustrated in FIGS. 7 and 8.

Now returning to FIGS. 2A–2C, the integration of the present invention 22 as a module 24 to a conventional or other type of automatic transmission expands the functionality of such conventional transmission. For example, if a module 24 having two-single stage speed converters with speed ratios 1.286:1 and 0.778:1, respectively, is operably connected to a conventional 4 speed automatic transmission 10, having gear ratios 2.8:1, 1.4:1, 1:1, and 0.72:1, the module 24 expands that 4 speed automatic transmission to a 10 speed automatic transmission with a greater speed ratio range and with smaller incremental steps between ratios. By providing a Logic Control Unit (LCU) as part of the present invention, which is described in further detail herein, a shifting sequence similar to that of Table 2A (below) can be achieved.

TABLE 2A

| 1st Gear = 2.8:1 | 2nd Gear = 1.4:1 | 3rd Gear = 1:1 | 4th Gear = 0.65:1 | SYNK stage 1 = 1.286:1 | SYNK stage 2 = 0.778:1 | Total ratio |
|---|---|---|---|---|---|---|
| Active | Inactive | Inactive | Inactive | Active | Inactive | 3.601:1 |
| Active | Inactive | Inactive | Inactive | Inactive | Inactive | 2.800:1 |
| Active | Inactive | Inactive | Inactive | Inactive | Active | 2.178:1 |
| Inactive | Active | Inactive | Inactive | Active | Inactive | 1.800:1 |
| Inactive | Active | Active | Inactive | Inactive | Inactive | 1.400:1 |
| Inactive | Inactive | Active | Inactive | Active | Inactive | 1.286:1 |
| Inactive | Inactive | Active | Inactive | Inactive | Inactive | 1.000:1 |
| Inactive | Inactive | Active | Inactive | Inactive | Active | 0.778:1 |
| Inactive | Inactive | Inactive | Active | Inactive | Inactive | 0.650:1 |
| Inactive | Inactive | Inactive | Active | Inactive | Active | 0.506:1 |

For comparison, Table 2B (below) shows the 4 speed conventional transmission shift sequence.

TABLE 2B

| 1st Gear = 2.8:1 | 2nd Gear = 1.4:1 | 3rd Gear = 1:0 | 4th Gear = 0.65:1 | Total ratio |
|---|---|---|---|---|
| Active | Inactive | Inactive | Inactive | 2.8:1 |
| Inactive | Active | Inactive | Inactive | 1.4:1 |
| Inactive | Inactive | Active | Inactive | 1.0:1 |
| Inactive | Inactive | Inactive | Active | 0.65:1 |

The invention as described above is suitable for rear wheel drive vehicles, front wheel drive vehicles and all wheel drive vehicles. For an all wheel drive vehicle, the module 24 (shown in FIG. 2C) is a replacement for the conventional transfer case 17. The driving member 12 (for example engine or motor) provides the input to the conventional automatic transmission 10, through, for example, a fluid coupling or clutch 44 or the like. The transmission output via transmission shaft 46 is the input into the module 24, which performs its speed conversion function as described above and provides for two outputs conveyed through shafts 16R, 16F. The shaft 16R provides the input for the rear axle differential 18R, which in turn provides the rotation of the rear axles 19R and ultimately the rear drive wheels 14R. The shaft 16F provides the input to the front axle differential 18F, which in turn provides the rotation of the front axles 19F, and ultimately the front drive wheels 14F.

Now returning to FIG. 5A, the driving member 12 (for example a motor or engine) and output crankshaft 48 provide the input to the multi-ratio transmission 26 through, for example, a fluid coupling or torque converter or clutch mechanism 44 or the like. The multi-ratio transmission 26, in this embodiment, illustrates a five-stage transmission with four forward stages $1^{st}$ stage 50, $2^{nd}$ stage 52, $3^{rd}$ stage 54, $4^{th}$ stage 56 for forward direction and one reverse stage 58 for reverse direction, which delivers 16 total ratios in the forward direction and one or more total ratios in the reverse direction that outputs to the rear differential 18R. The transmissions for the front wheel and all wheel drives, illustrated in FIGS. 3B, 3C and 5B, have an identical single stage speed converter system as disclosed for the rear wheel transmission.

The multi-ratio transmission 26 output via shaft 16 to the driving member 20 will be at a speed ratio relative to the input speed (engine or motor or transmission speed), which is the product of the individual active or engaged ratio or ratios. For example, the ratios are: Reverse stage 58 2.5:1, $1^{st}$ stage 50 3.25:1, $2^{nd}$ stage 52 1.80:1, $3^{rd}$ stage 54 0.88:1 and $4^{th}$ stage 56 0.75:1. The reverse stage 58 is only considered when the vehicle is operated in reverse. In the case where all four stages 50, 52, 54, 56 are active or engaged, the resultant total ratio of the multi-ratio transmission 26 is 3.25×1.8×0.88×0.75=3.86:1. In the case where none of the stages active or engaged, the effective total ratio is 1:1. The matrix shown in Table 3 (below) indicates the various combinations of ratio stages and the resultant 16 total possible total speed conversion ratios (in the forward direction).

TABLE 3

| Stage 1 = 3.25:1 | Stage 2 = 1.8:1 | Stage 3 = 0.88:1 | Stage 4 = 0.75:1 | Total ratio |
|---|---|---|---|---|
| Active | Active | Inactive | Inactive | 5.850:1 |
| Active | Active | Active | Inactive | 5.148:1 |
| Active | Active | Inactive | Active | 4.388:1 |
| Active | Active | Active | Active | 3.861:1 |
| Active | Inactive | Inactive | Inactive | 3.250:1 |
| Active | Inactive | Active | Inactive | 2.860:1 |
| Active | Inactive | Inactive | Active | 2.438:1 |
| Active | Inactive | Active | Active | 2.145:1 |
| Inactive | Active | Inactive | Inactive | 1.800:1 |
| Inactive | Active | Active | Inactive | 1.584:1 |
| Inactive | Active | Inactive | Active | 1.350:1 |
| Inactive | Active | Active | Active | 1.188:1 |
| Inactive | Inactive | Inactive | Inactive | 1.000:1 |
| Inactive | Inactive | Active | Inactive | 0.88:1 |
| Inactive | Inactive | Inactive | Active | 0.75:1 |
| Inactive | Inactive | Active | Active | 0.66:1 |

The grounding (for example, clutching or braking) of the various elements for each ratio stage is dependent on the design of that specific single stage speed converter 28 (FIG. 6). For certain ratios, the only grounding required is for one of the three single stage speed converter 28 primary elements illustrated in FIG. 6 (inner cam 30, reaction disk 32, or outer cam 33). For other ratios, it may be necessary to ground or couple two of the three primary elements of that ratio stage. The determination regarding which elements require grounding, is based on the specific single stage speed converter 28 design and if that single stage speed converter 28 has the ability to be back driven (output as input and input as output). The single stage speed converter 28 that is non-back drivable behaves as a 1:1 coupling when none of the elements are being grounded. Ratios that are considered back drivable behave as a 1:1 coupling when two of the elements are grounded or coupled to each other. In the embodiment of FIG. 5A, the $1^{st}$ stage 50 and $2^{nd}$ stage 52 require two clutches each and the $3^{rd}$ stage 56 and $4^{th}$ stage 58 require only one clutch each.

Figure 9:
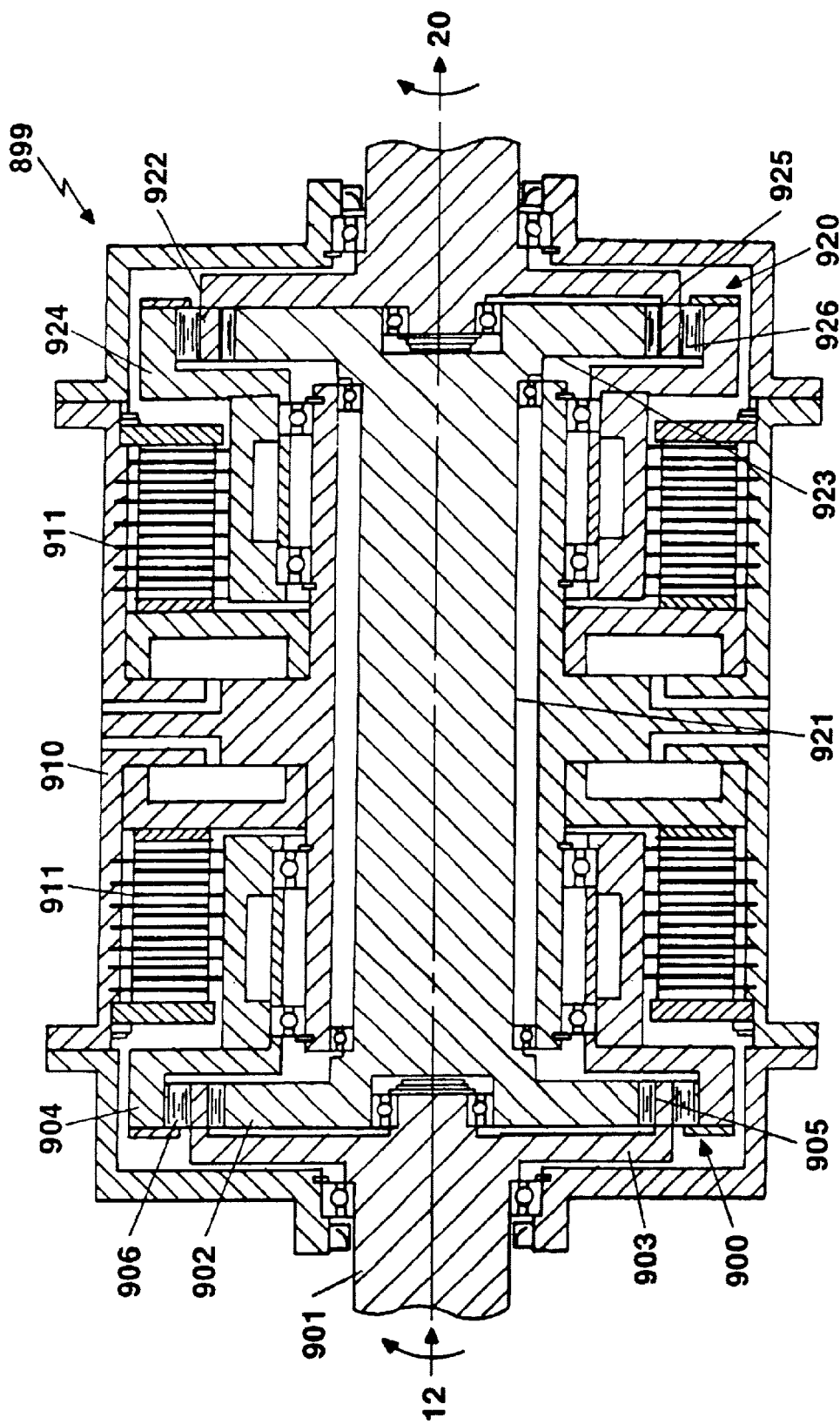
FIG. 9 is a sectional view of an embodiment of the present invention having two single stage speed converters.

Now turning to FIG. 9, a two stage multi-ratio transmission 899 is capable of delivering (4) speed ratios. In this embodiment, the input speed of a $1^{st}$ stage single stage speed converter 900 is provided by the driving member 12 through an input shaft 901 of a reaction disk 903. An outer cam 904 being free to rotate (not grounded to the housing 910) produces an output speed to the inner cam 902 at a 1:1 ratio. The outer cam 904 being grounded to the housing 910, via some method of grounding 911 (such as clutching or braking), engages or activates the single stage speed converter 900, thereby producing an output speed at the inner cam 902 that is at an increased or reduced speed from the input speed. The speed conversion ratio is specifically the active ratio of that single stage speed converter 900 configuration. The speed conversion ratio is determined by the following formula:

$$\text{Speed ratio } SR = \frac{\text{\# of lobes on the output element}}{\text{\# of lobes on the input element}}$$

Where:

input element is the reaction disk 903 output element is the inner cam 902

For example, in this embodiment of the invention, the outer cam 904 has (4) lobes, the inner cam 902 (input element) has (18) lobes, the reaction disk 903 (output element) has (22) slots 905, and (22) contact members 906 (such as rollers, roller device, or bearings) produces a speed conversion ratio SR=18/22=0.82:1, or a speed increased output equal to input speed divided by 0.82. The output of the $1^{st}$ stage single stage speed converter 900 is now the input to the $2^{nd}$ stage single stage speed converter 920.

The $2^{nd}$ stage single stage speed converter 920 has an input shaft 921 (integral with inner cam 923 and inner cam 902) that delivers the input speed to the $2^{nd}$ stage single stage speed converter 920, which produces a 1:1 speed conversion at the reaction disk 922 output when the outer cam 924 is free to rotate (not grounded) relative to the housing 910. The $2^{nd}$ stage single stage speed converter 920 is engaged or active when the outer cam 924 is grounded to the housing 910 via a grounding member 911 (such as a clutch or brake), thereby producing an output speed at the reaction disk 922 that is at decreased speed from the input speed. The speed conversion ratio is specifically the active ratio of the $2^{nd}$ stage single stage speed converter 920. In this embodiment, the speed conversion ratio is determined by the formula as follows:

$$\text{Speed ratio } SR = \frac{\text{\# of lobes on the input element}}{\text{\# of lobes on the output element}}$$

Where:

input element is the inner cam 923 output element is the reaction disk 922

The alternative embodiment, shown in FIG. 9, includes an outer cam 924 having (4) lobes, an inner cam 922 having (10) lobes, a reaction disk 923 having (14) slots 925, and (14) rollers 926 yields a speed conversion ratio SR=14/10=1.4:1, or a speed decreased output equal to input speed divided by 1.4. The embodiment of FIG. 9 with these example ratios, can provide four different total speed conversion ratios; 1:1, 1.4:1, 1.15:1, and 0.82:1.

It should be understood that any finite number of single stage speed converters, either similar to the $1^{st}$ stage single stage speed converter 900 or similar to the $2^{nd}$ stage single stage speed converter 920, can be configured to achieve the desired number of ratio stages. Each single stage speed converter is considered a ratio stage. Each ratio stage produces either a speed reduction, speed increase, or acts as a 1:1 coupling (input speed equal to output speed) when all members are free to rotate. The overall speed ratio of a multi-ratio transmission is determined by the product of the active speed ratio of all stages within the module 24 or the transmission 26.

Figure 10:
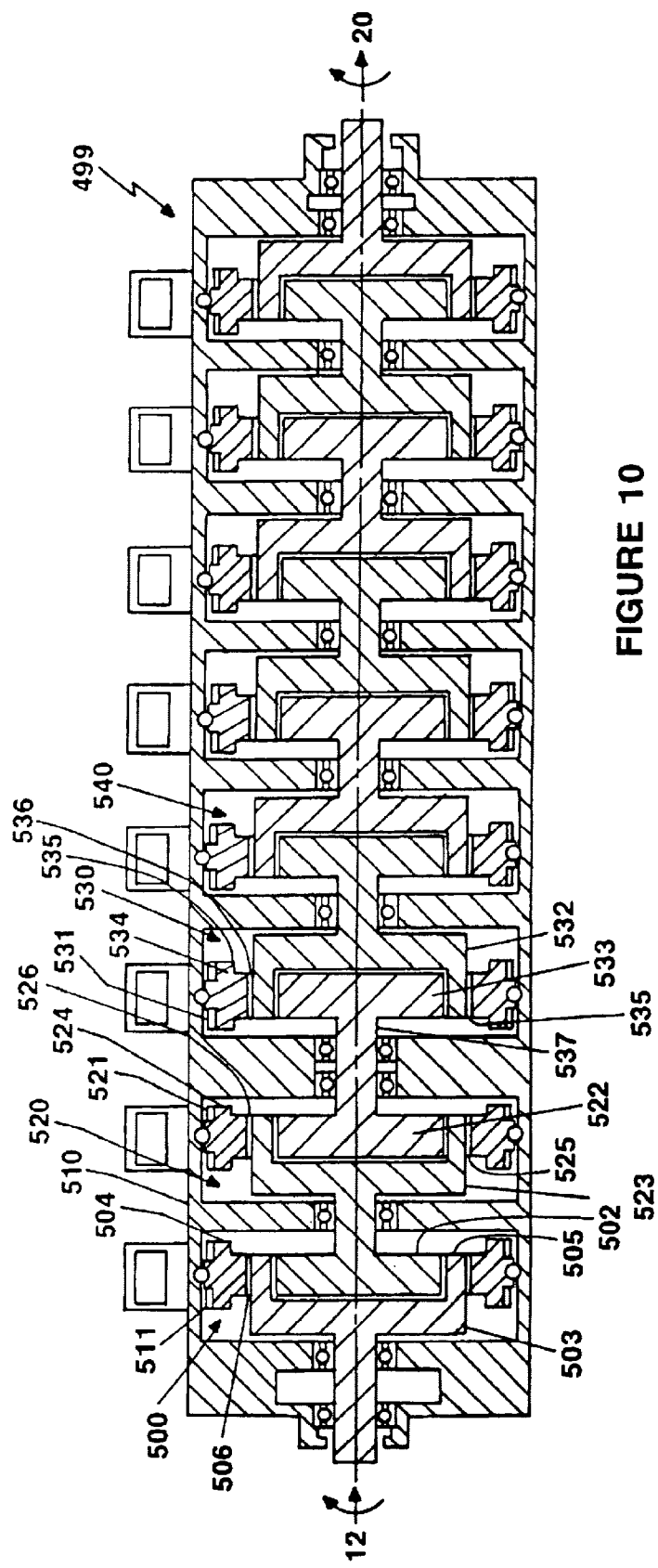
FIG. 10 is a sectional view of an alternative embodiment of the present invention having eight single stage speed converters.

Now turning to another exemplary embodiment 499 of a multi-stage speed converter module or transmission capable of delivering 16 or more speed ratios is illustrated in FIG. 10. In this embodiment, a $1^{st}$ stage single stage speed converter 500 has an input from the driving member 12 applied at a reaction disk 503 for delivering the input speed to the $1^{st}$ stage single stage speed converter 500, which produces the output of a inner cam 502 at a 1:1 ratio when the outer cam 504 is free to rotate (not grounded to the housing 510). The $1^{st}$ stage single stage speed converter 500 being engaged or active when the outer cam 504 is grounded to the housing 510 via some method of grounding 511 (such as clutching or braking), thereby producing an output speed at the inner cam 502 that is at an increased speed from the input speed. The speed conversion ratio is specifically the active ratio of that $1^{st}$ stage single stage speed converter 500 configuration. In this embodiment, the speed conversion ratio is determined by the following formula:

$$\text{Speed ratio } SR = \frac{\text{\# of lobes on the output element}}{\text{\# of lobes on the input element}}$$

Where:

input element is the reaction disk 503 output element is the inner cam 502

For the embodiment shown in FIG. 10 and disclosed above, the outer cam 504 has (4) lobes, the inner cam 502 has (12) lobes, the reaction disk 503 has (16) slots 505 and (16) contact members 506 (such as rollers or roller device or bearings). The speed conversion ratio SR is 12/16=0.75:1, or a speed increased output equal to input speed divided by 0.75. The output of the $1^{st}$ stage single stage speed converter 500, is now the input to the $2^{nd}$ stage single stage speed converter 520.

The 2nd stage single stage speed converter 520, which has an input at the reaction disk 523 (which is integral with inner cam 502) delivering the input speed to the $2^{nd}$ stage single stage speed converter 520 drives inner cam 522 at a 1:1 ratio when the outer cam 524 is free to rotate (not grounded) relative to the housing 510. The 2nd stage single stage speed converter 520 being engaged or active when the outer cam 524 is grounded to the housing 510, via a grounding mechanism 521 (such as a clutch or a brake or the like), thereby producing an output speed at the inner cam 522 that is at an increased speed from the input speed. The speed conversion ratio is specifically the active ratio of that $2^{nd}$ stage single stage speed converter 520 configuration. In this embodiment, the speed conversion ratio is determined by the formula as follows:

$$\text{Speed ratio } SR = \frac{\text{\# of lobes on the output element}}{\text{\# of lobes on the input element}}$$

Where:

input element is the reaction disk 523 output element is the inner cam 522

For the embodiment shown in FIG. 10, if the outer cam 524 has (2) lobes, the inner cam 522 has (12) lobes, the reaction disk 523 has (14) slots 525, and (14) rollers 526, then the speed conversion ratio SR=12/14=0.857:1, or a speed increased output equal to input speed divided by 0.857. The output of the 2nd stage single stage speed converter 520 is the input to the $3^{rd}$ stage single stage speed converter 530.

The $3^{rd}$ stage single stage speed converter 530, which has an input shaft 531 integral with inner cam 533 and inner cam 522, delivers the input speed to the $3^{rd}$ stage single stage speed converter 530. The inner cam 533 drives a reaction disk 532 at a 1:1 ratio when the outer cam 534 is free to rotate (not grounded) relative to the housing 510. When the outer cam 534 is grounded to the housing 510 via a grounding mechanism 531 (such as a clutch or a brake), the $3^{rd}$ stage single stage speed converter 530 becomes engaged or active, thereby producing an output speed at the reaction disk 532 that is at decreased speed from the input speed. The speed conversion ratio is specifically the active ratio of the $3^{rd}$ stage single stage speed converter 530 configuration. In this embodiment, the speed conversion ratio is determined by the formula as follows:

$$\text{Speed ratio } SR = \frac{\text{\# of lobes on the input element}}{\text{\# of lobes on the output element}}$$

Where:

input element is the inner cam 534 output element is the reaction disk 532

For the embodiment shown in FIG. 10 and disclosed above, the outer cam 534 has (4) lobes, the inner cam 532 has (12) lobes, the reaction disk 533 has (16) slots 535 and (16) contact members 536 (such rollers, roller device or bearings). The speed conversion ratio SR for this embodiment is 16/12=1.33:1, or a speed decreased output equal to input speed divided by 1.33. The output of the 3rd stage single stage speed converter 530 is the input to the 4th stage single stage speed converter 540.

In this embodiment, for illustration purposes only, stages 3–8 have identical speed conversion ratios as shown in table 4 (below). The embodiment being a sixteen speed automatic transmission with a speed ratio range greater than 8.

TABLE 4

| 1ST Stage | 2ND Stage | 3RD Stage | 4TH Stage | 5TH Stage | 6TH Stage | 7TH Stage | 8TH Stage | Total Ratio |
|---|---|---|---|---|---|---|---|---|
| Inactive | Inactive | Active | Active | Active | Active | Active | Active | 5.53:1 |
| Inactive | Active | Active | Active | Active | Active | Active | Active | 4.74:1 |
| Inactive | Inactive | Inactive | Active | Active | Active | Active | Active | 4.16:1 |
| Inactive | Active | Inactive | Active | Active | Active | Active | Active | 3.57:1 |
| Inactive | Inactive | Inactive | Inactive | Active | Active | Active | Active | 3.13:1 |
| Inactive | Active | Inactive | Inactive | Active | Active | Active | Active | 2.68:1 |
| Inactive | Inactive | Inactive | Inactive | Inactive | Active | Active | Active | 2.35:1 |
| Inactive | Active | Inactive | Inactive | Inactive | Active | Active | Active | 2.02:1 |
| Inactive | Inactive | Inactive | Inactive | Inactive | Inactive | Active | Active | 1.77:1 |
| Inactive | Active | Inactive | Inactive | Inactive | Inactive | Active | Active | 1.52:1 |
| Inactive | Inactive | Inactive | Inactive | Inactive | Inactive | Inactive | Active | 1.33:1 |
| Inactive | Active | Inactive | Inactive | Inactive | Inactive | Inactive | Active | 1.14:1 |
| Inactive | Inactive | Inactive | Inactive | Inactive | Inactive | Inactive | Inactive | 1.00:1 |
| Inactive | Active | Inactive | Inactive | Inactive | Inactive | Inactive | Inactive | 0.857:1 |
| Active | Inactive | Inactive | Inactive | Inactive | Inactive | Inactive | Inactive | 0.750:1 |
| Active | Active | Inactive | Inactive | Inactive | Inactive | Inactive | Inactive | 0.643:1 |

In yet another embodiment of the present invention that takes the configuration of FIG. 10 and the shifting sequence of Table 4, it is shown that a transmission can operate with a shifting sequence that engages every other total ratio listed on Table 4 to achieve an extremely smooth, high performance, and efficient acceleration from rest through high speed cruise as the transmission launches with all six reducing ratios engaged (ratio stages 3–8). Further the transmission is programmed to shift to the next ratio by un-clutching one of the reducing ratios at each shift point until the total ratio speed conversion ratio is 1:1 with no ratios engaged, therefore no grounding members or clutches are energized. Thereby providing a highly efficient operating condition. During this sequence, there is no power interruption at any shift point through the entire sequence.

Figure 11:
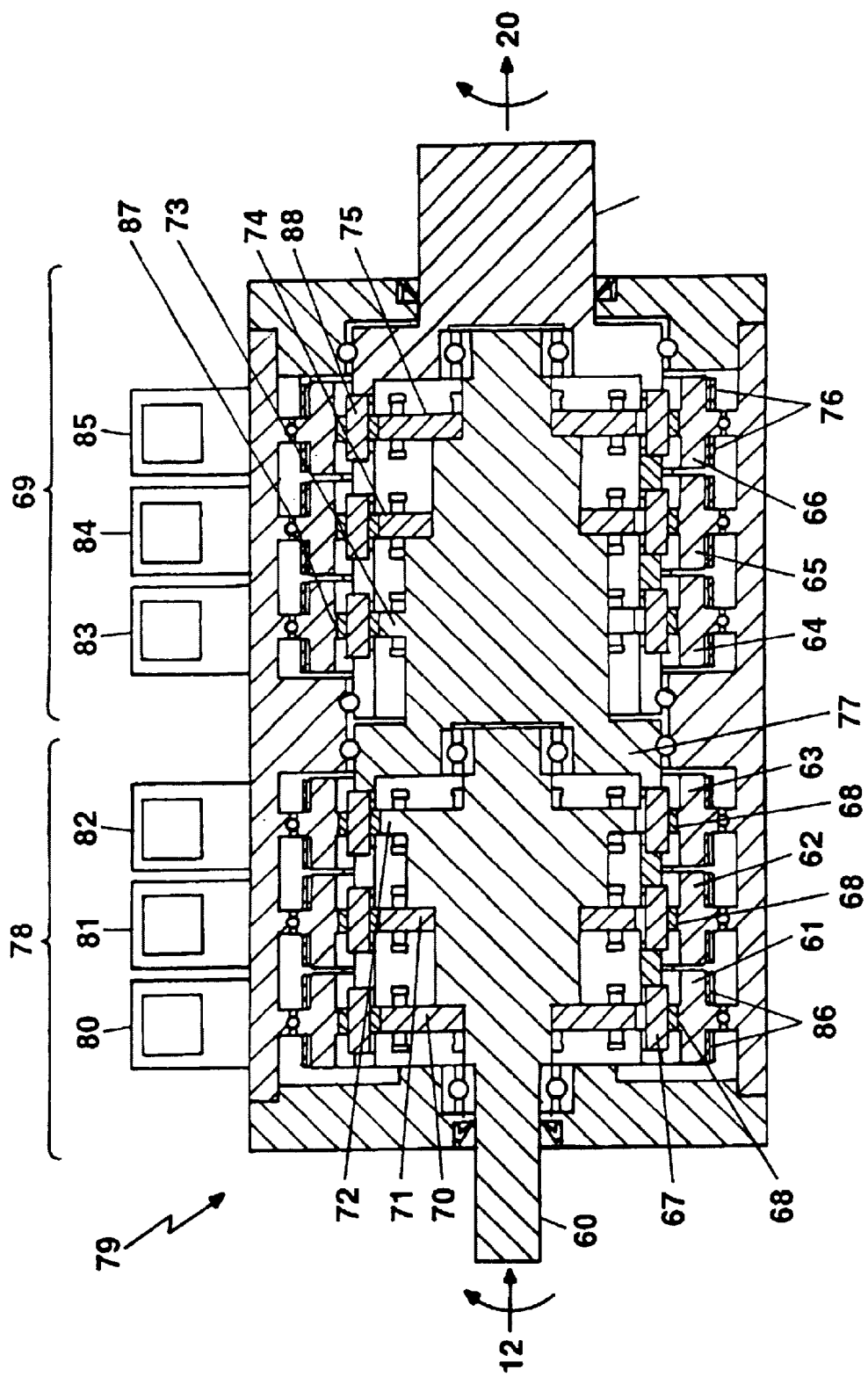
FIG. 11 is a sectional view of another alternative embodiment of the present invention having a multi-stage multi-cam speed converter.

A further embodiment 79 of the present invention 22 is illustrated in FIG. 11. The input shaft 60 from the driving member 12 (such as an engine or motor or transmission) rotates inner cams 70, 71, 72 of the 1st stage multi-cam speed converter 69 that interact with outer cams 61, 62, 63, respectively, through the contact members 68 (such as rollers). Pins 67 interact with the reaction disk 77, which is the output shaft of the 1st stage multi-cam speed converter 69. The hydraulic cylinders 80, 81, 82 select which outer cam 61, 62, 63 within the 1st stage multi-cam speed converter 69 will be engaged or activated. For example, actuator 80 will ground outer cam 61 by means, for example, of brake bands 86, and the ratio of inner cam 70 and outer cam 61 through the roller 68 and pin 67 will be the output speed of the reaction disk 77. In like manner, the combination of inner cam 71 and outer cam 62 will produce a second ratio and different output speed of the reaction disk 77, and the combination of inner cam 72 and outer cam 63 will produce yet another different output speed of the reaction disk 77.

Figure 12:
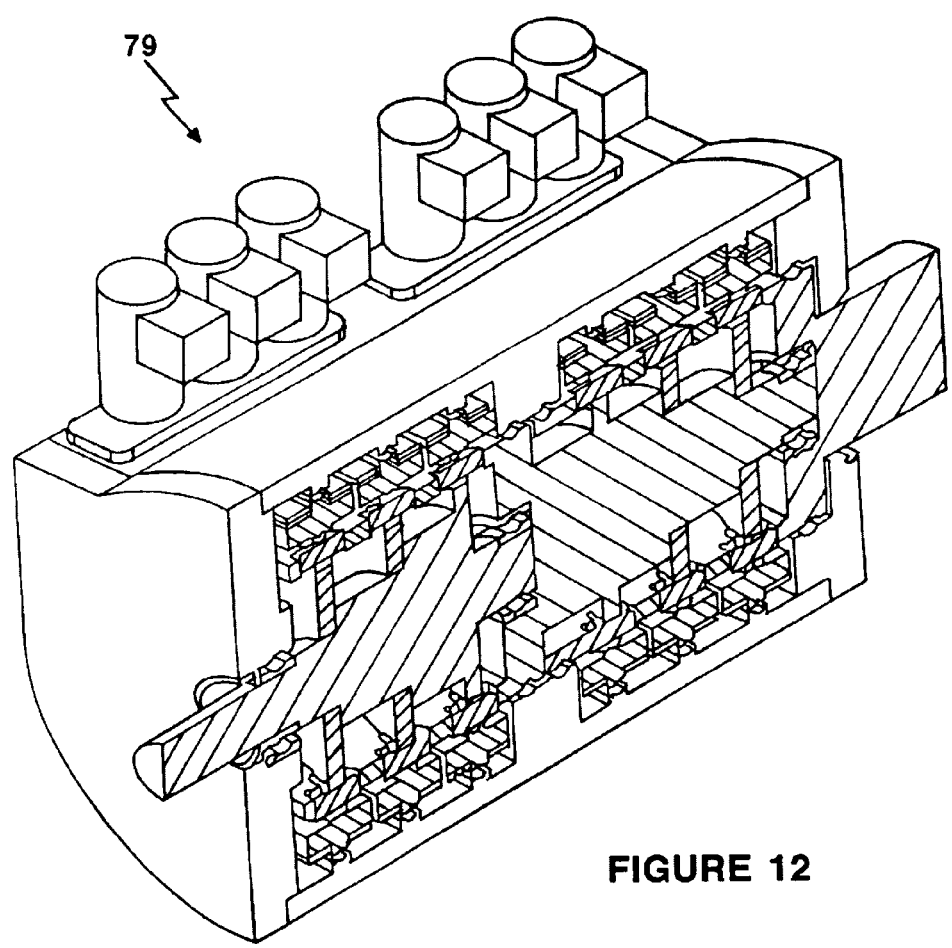
FIG. 12 is a pictorial, sectional view of the alternative embodiment of FIG. 11.

The reaction disk 77 is also the inner cam and input to the 2nd stage multi-cam speed converter 78, as well as the output of the 1st stage multi-cam speed converter 69. The reaction disk 77 rotates inner cams 73, 74, 75 of the 2nd stage multi-cam speed converter 78. The inner cams 73, 74, 75 interact with outer cams 64, 65, 66 through contact members 87 (such as rollers, roller device, or bearings) and pins 88, similar to 67 and 68, respectively, for three specific speed conversion ratios. Actuation of hydraulic cylinders 83, 84, 85 selects the ratio to output through reaction disk 69. For example, actuation of hydraulic cylinder 85 activates bands 76 to ground outer cam 66 to interact with inner cam 75 through contact members 87 and pin 88 to produce a speed conversion ratio. The speed conversion ratio of the 2nd stage multi-cam speed converter 78 is combined with the speed conversion ratio of the 1st stage multi-cam speed converter 78 to produce the overall output speed conversion of the transmission 79. The non-clutched 1st stage multi-cam speed converter 78 will be freewheeling. In like manner, other output conversion speeds are possible and for the three stages of 1st stage multi-cam speed converter 78 and the three stages of 2nd stage multi-cam speed converter 78 for a total of nine speed ratios are possible. FIG. 12 is a pictorial representation of the transmission, or alternatively a speed conversion module, of the embodiment shown in FIG. 11.

As discussed above, by varying the number of cams in a multiple stage transmission or speed conversion module, as disclosed above, there are numerous speed ratios possible with the present invention. For example, two single stage-four cam speed converter in a multi-stage converter yields (16) speed conversion ratios. Three single stage-three cam speed converters in multi-stage converter yields (27) speed conversion ratios. Therefore, it is possible to have a multiple stage transmission or speed conversion module with multiple speed ratios by varying the number of single state-multi cam stages and/or the of number single stage-single cam speed converter 28 in each stage.

Figure 13:
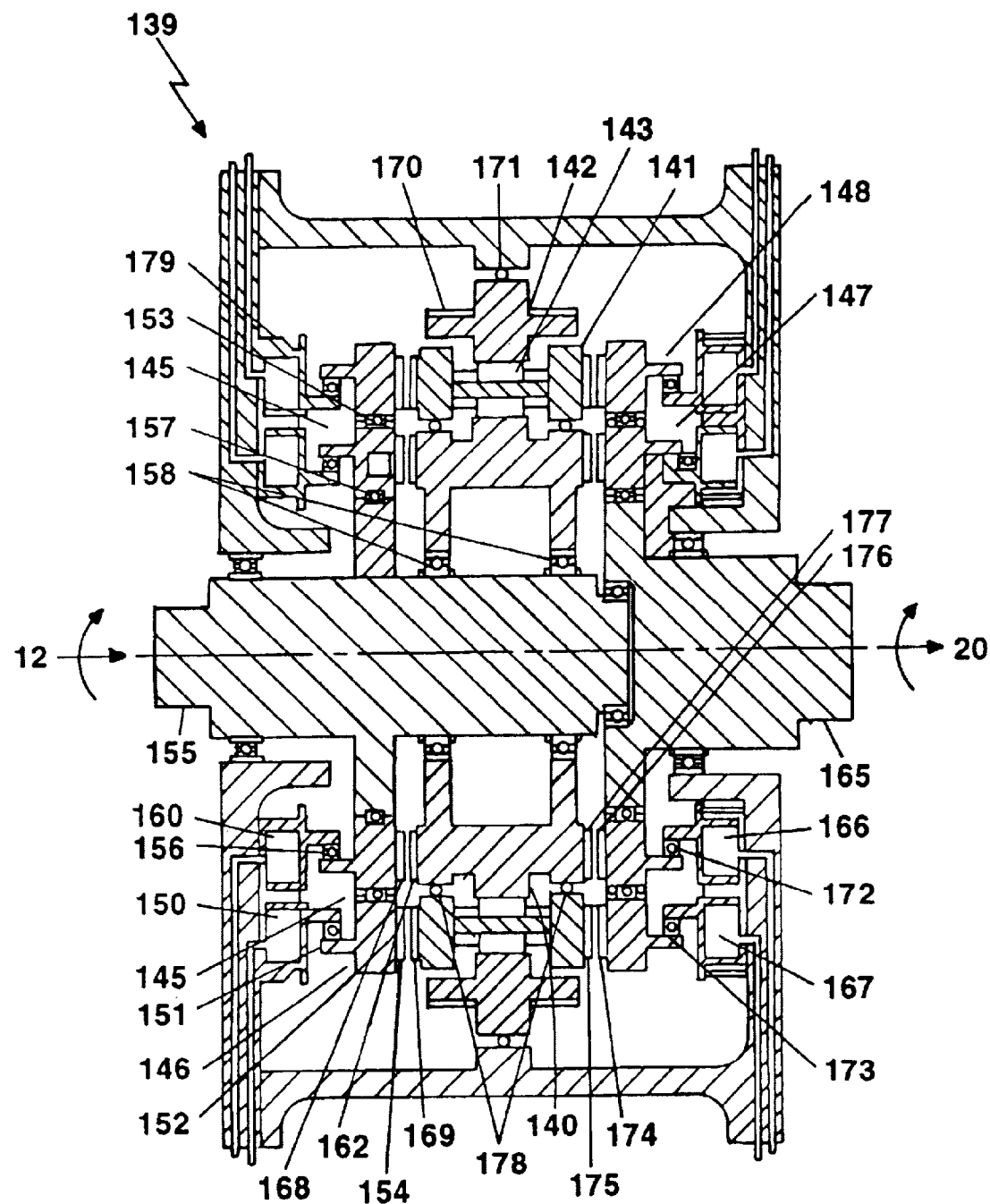
FIG. 13 is a sectional view of another alternative of a multi-stage speed converter of the present invention.

A further alternative embodiment 139 is illustrated in FIG. 13 including an input inner cam 140, a reaction disk 141, outer cam 142, contact members 143 (such as rollers, roller device, or bearings), and four face clutch assemblies 145, 146, 147 and 148. Each face clutch assembly, such as 146, includes a circular ring piston 150, a bearing 151, a clutch plate 152, a key 153 and a friction pad 154. The inner cam 140 includes a friction pad 162 and the reaction disk 141 includes a friction pad 169. The inner cam 140, when rotating, imparts rotation through keys 157 and 153 to the two input face clutches 145, 146. The input face clutches 145, 146 are free to rotate on their respective bearings 156 and 151. With the circular ring pistons 150, 160 de-energized, the input face clutches 145, 146 are rotating and do not impart rotation to either the input cam 140 or reaction disk 141. When one of the circular ring pistons 150 and 160 is energized, it's linear displacement will translate the face clutch assembly 145 or 146 into engagement, and with an appropriate pressure, effectively bonding the friction pads and impart the input rotational speed to that element of the transmission or speed converter 139. The non-energized piston will remain in place by, for example, springs 179, and the input face clutch 145 or 146 will rotate freely on its bearing 151 and at the speed of the inner cam 140. By activating combinations of these four face clutches 145, 146, 147, 148, the ratio nos. of 1 and 6 of Table 1 can be realized.

Accordingly, ratio no. 1 is achieved by activating circular ring piston 160, which translates clutch assembly 145 to engage inner cam 140, allowing friction pads 162 and 168 to be bonded and transmit the rotational speed of the input shaft 155 to the inner cam 140. At the same time piston 167 is energized enabling face clutch assembly 148 to translate, friction pads 175, 177 to bond, and the velocity of the reaction disk 141 to adjust to a converted speed in accordance with its ratio, which is transmitted to the output shaft 165. The two un-energized face clutch assemblies will rotate in accordance with the input speed or the output speed respectively. In similar manner, pistons 150 and 166 are energized and ratio no. 6 of Table 1 is selected such that a second speed conversion ratio can be realized. Band brake 170 is activated in both configurations to ground the outer cam 142 and complete the kinematic function of the transmission or speed converter 139.

Further, a third output speed is possible as earlier described, namely a 1:1 speed wherein the input shaft 155 and the output shaft 165 rotates at the same speed by activating all four face clutch assemblies 145, 146, 147 and 148 and deactivating the brake band 170 and allowing the outer cam 142 to rotate on its bearing 171. Effectively, the transmission or speed converter 139 is locked up and the input shaft 155 is directly coupled to the output shaft 165 such that both rotate at the same speed.

Accordingly, multiple assemblies of such transmission or speed converter assemblies 139 provide for larger transmissions or speed converters with multiple speed ratios with very few single stage speed converters. For example, but not limited to, a configuration of two such transmission or speed converter assemblies 139, as shown in FIG. 13 is capable of nine speed ratios.

Figure 14:
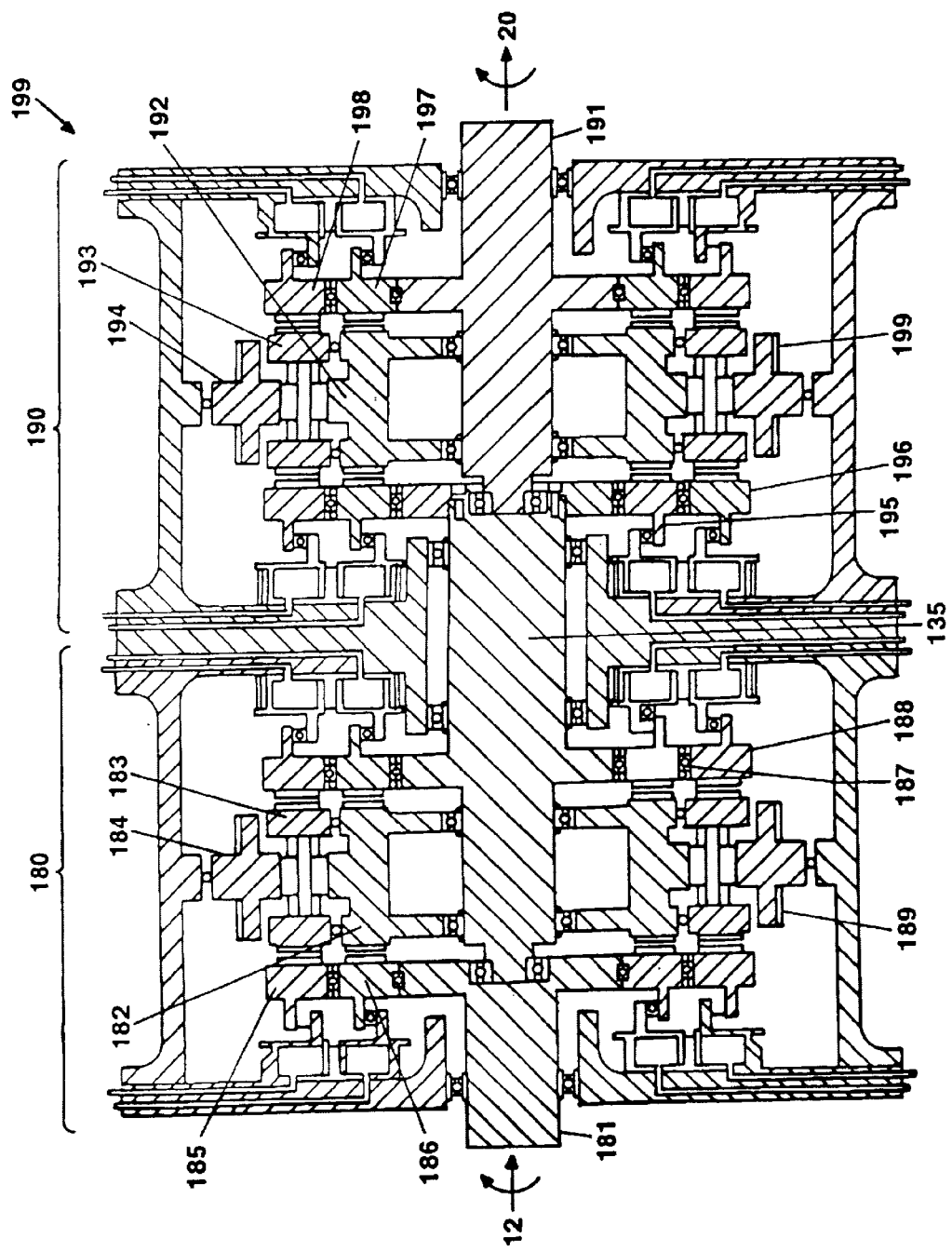
FIG. 14 is a sectional view of another alternative of a multi-stage speed converter of the present invention.

FIG. 14 illustrates the converter unit 199 as the combination of two single stage speed converters 180, 190, as disclosed above and illustrated in FIG. 13, as a single transmission or speed converter unit 199. The two speed converters 180, 190 include the appropriate grounding mechanism similar to the clutch and brake arrangements disclosed above for the single stage transmission or speed converter assembly 139 of FIG. 13. Driving member 12 provides input speed to input shaft 181 of 1st single stage speed converter 180. The 1st single stage speed converter 180 outputs to shaft 135 a output speed at the selected ratio. In turn, the output speed is inputted into the 2nd single stage speed converter 190. Therein, the 2nd single stage speed converter 190 outputs to shaft 191 an output speed at a selected speed conversion ratio. The overall conversion ratio is the product of the two selected ratios in the two single stage speed converters 180, 190. With appropriate ratios for each single stage speed converter, an automobile transmission of nine forward speeds is provided utilizing two single stage speed converter 180, 190. It follows that additional single stage speed converters added to the transmission will produce a higher number of ratios. For example, with three single stage speed converters, twelve clutches and three brakes, a transmission is capable of 27 speed conversion ratios.

Figure 15:
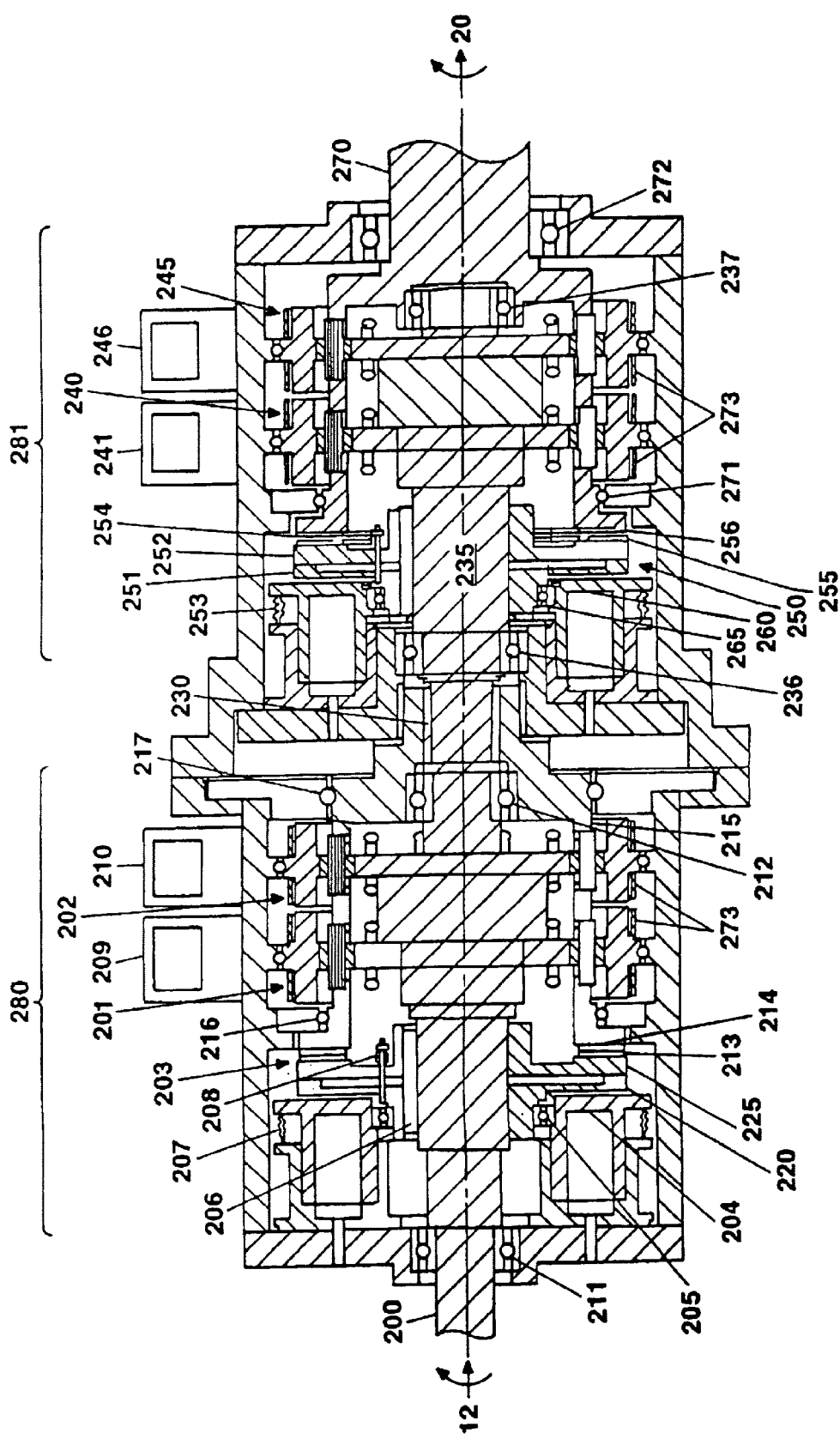
FIG. 15 is a sectional view of another alternative of a multi-stage speed converter of the present invention.

Yet another alternative embodiment having nine-speed transmission utilizing (4) single stage speed converters, (4) band brakes 273, and (2) face clutches 203, 250 is illustrated in FIG. 15. The input shaft 200 operably connected to the driving member 12 drives the two single stage speed converters 201, 202, of the 1st multi-stage speed converter 280 in similar manner as described for the single stage-multi cam speed converters 69, 78 of FIG. 11. Actuators 209, 210 selectively ground the two single stage speed converters 201, 202, respectively to activate the single stage-multi cam speed converters 201, 202. The output shaft 215 of the two single stage-multi cam speed converters 201 and 202, is the input shaft into the 2nd multi-stage speed converter 281.

However, there is a third output of the 1st multi-stage speed converter 280 that is activated by, for example, the clutch assembly 203. The clutch assembly 203, which is integrally connected, via a key 206 in this embodiment to the input shaft 200, rotates with the input shaft 200 on, for example, bearing 205. The clutch assembly 203 is also free to slide axially when displaced by piston 204 forcing the frictional pads 213, 214 together. In this condition, the input shaft 200, along with inner cams of the two single stage speed converters 201, 202 is locked with the output reaction disk 215 creating a locked first stage which will now output a 1:1 speed conversion ratio via the output shaft 215, thereby becoming a third possible output conversion ratio. Pressure is applied to the piston 204 at the appropriate level to ensure no slippage at the friction pad interface. Pressure is released when not required by appropriate valving. A diaphragm spring 220 transmits the pressure and deflects to ensure total engagement of the friction pads 213, 214, via clutch hub 225. The energized springs 207, 208 working in concert with the stored energy in the diaphragm spring 220 released the combined potential energy when piston 204 is de-energized and returns clutch assembly 203 to its neutral or de-clutched position on the input shaft 200, thereby declutching reaction disk 215. Appropriate bearings 211, 212, 216 and 217, are included to support input shaft 200, and reaction disk output shaft 215.

Input is transmitted into the 2nd multi-stage speed converter 281, including the two single stage speed converters 240, 245 via, for example, the input spline 230. The input spline 230 has a clutch assembly 250 that will function when energized by the piston 260 in similar manner to the 1st multi-stage speed converter 280. Appropriate pressure is applied by piston 260 to clutch hub 252 through bearing 265 to ensure engagement of clutch pads 255, 256. Diaphragm spring 251, ensures such engagement while deflecting and along with springs 253, 254 allows for declutching input shaft 23 and output shaft 270 when pressure is released by appropriate valving. When the shafts 235, 270 are fully engaged via the assembly clutch 250 the speed conversion ratio of the 2nd multi-stage speed converter 281 is 1:1. Shaft 270 is at one speed ratio thereby presenting three speed ratios to interact with the three speed ratios of the 1st multi-stage speed converter 280 resulting in a nine speed transmission utilizing four single stage speed converter 28s. Here, as in the 1st multi-stage speed converter 281, appropriate bearings 236, 237 and 271, 272, are included for rotary support of input shaft 235 and output shaft 270. Single stage speed converter 240, 245 are activated by hydraulic cylinders 241, and 246, respectively.

Figure 16:
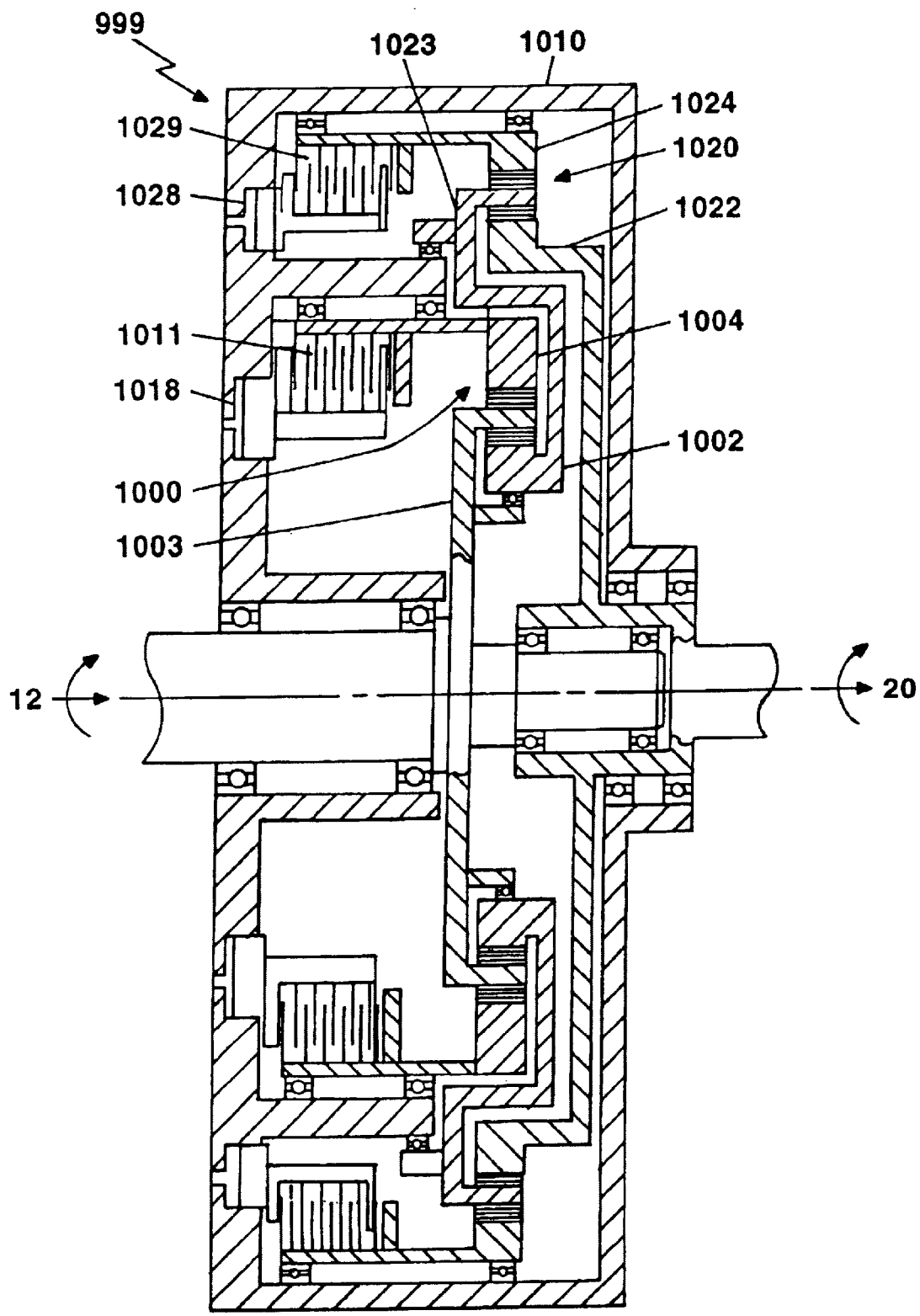
FIG. 16 is a sectional view of a nested multi-stage speed converter of the present invention.

Yet another alternative embodiment 999 is illustrated in FIG. 16. A nested two stage speed converter module or transmission 999 being capable of delivering (4) speed ratios. In this embodiment, the two stages 1000, 1020 are nested to minimize the axial length of the speed converter or transmission 999. In this embodiment, the $1^{st}$ stage single stage speed converter 1000, which has an input at the reaction disk 1003 delivering the input speed to the 1st stage single stage speed converter 1000, produces inner cam 1002 output at a 1:1 ratio when the outer cam 1004 is free to rotate (not grounded) to the housing 1010. When the outer cam 1004 is grounded to the housing 1010 as the hydraulic piston 1018 is pressurized, the ground mechanism 1011 (such as a clutch) activates and the 1st stage single stage speed converter 1000 is engaged or active, thereby producing an output speed at the inner cam 1002 that is at an increased speed from the input speed. The speed conversion ratio is specifically the active ratio of that 1st stage single stage speed converter 1000 configuration. The speed conversion ratio is determined by the formula as follows:

$$\text{Speed ratio } SR = \frac{\text{\# of lobes on the output element}}{\text{\# of lobes on the input element}}$$

Where:
input element is the reaction disk 1003
output element is the inner cam 1002

As disclosed above, the 1st stage single stage speed converter 1000 delivers a speed increased output when engaged or active. The output of the 1st stage single stage speed converter 1000 is the input to the $2^{nd}$ stage single stage speed converter 1020. The $2^{nd}$ stage single stage speed converter 1020, which has an input as reaction disk 1023 delivering the input speed to the 2nd single stage speed converter 1020, produces its inner cam 1022 output at a 1:1 ratio when the outer cam 1024 is free to rotate (not clutched) relative to the housing 1010. When the outer cam 1024 is grounded to the housing 1010 by pressurizing piston 1028, then the clutch 1029 is activated and the $2^{nd}$ stage single stage speed converter 1020 is engaged or active, thereby producing an output speed at the inner cam 1022 that is at increased speed from the input speed. The speed conversion ratio is determined in a similar fashion for the $1^{st}$ stage single stage speed converter 1000. The total speed conversion ratio is the product of each active stage single stage speed converters 1000, 1020.

The nested two stage speed converter module or transmission 999 as disclosed above and illustrated in FIG. 16 yields a two-ratio speed increase. However, it is also possible to configure other assemblies utilizing this nested configuration such as, but not limited to, a two stage with both stages as speed reducers, a two stage with one single stage speed converter as a speed increaser an the other single stage speed converter as a speed increaser.

Figure 17A:
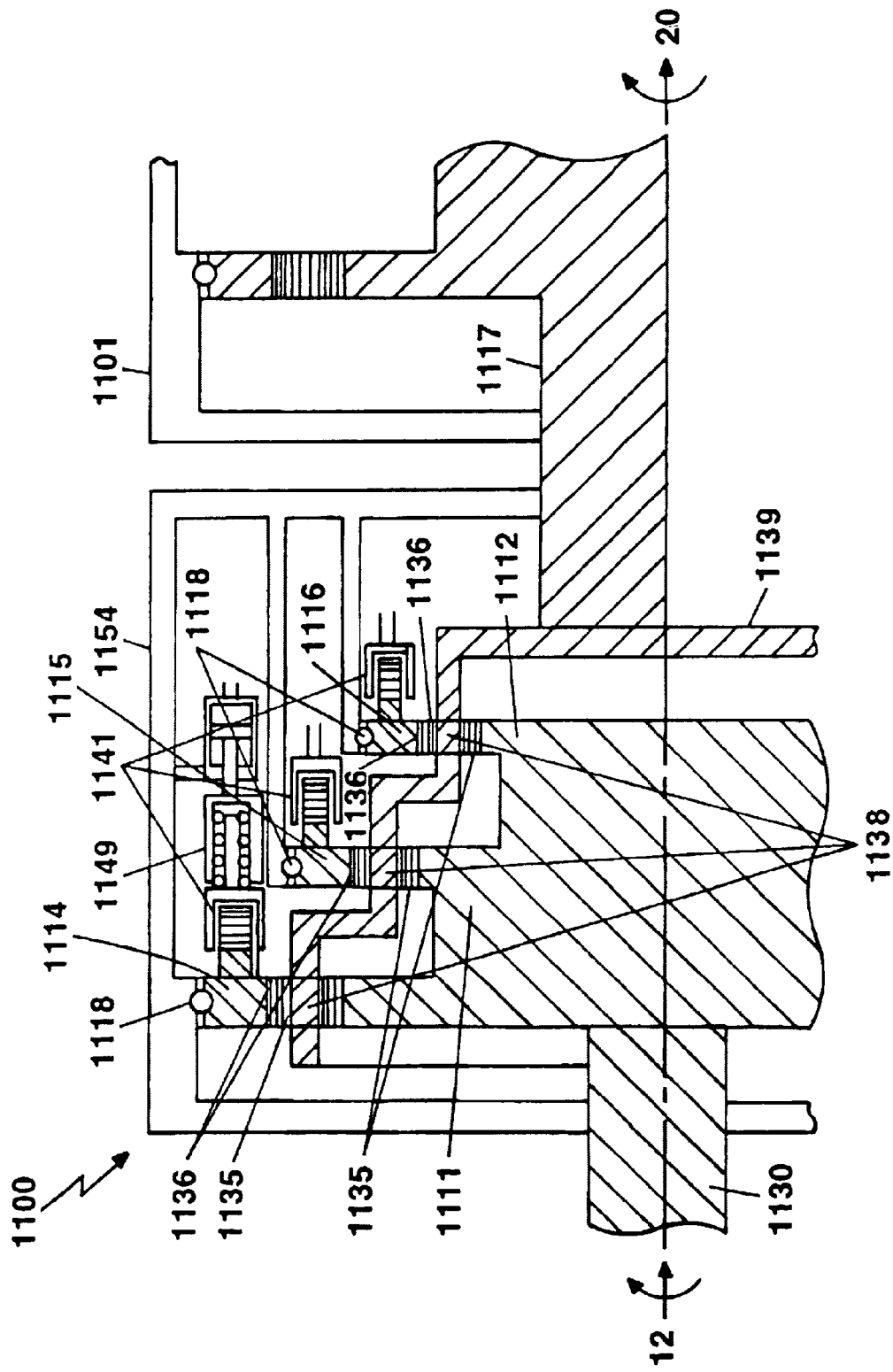
FIG. 17A is a partial sectional view of an exemplary embodiment of a grounding member and an outer cam of the present invention.

Yet another embodiment 1100 of a multi-input cam embodiment is illustrated in FIG. 17A. The embodiment 1100 has an input crankshaft 1130 configured with a cluster of three integral inner cams 1110, 1111, 1112 that, when rotating, displace the contact members 1135 (such as rollers, roller device, or bearing) outwardly which, in turn, interacts with the flanks 1136 of the outer cams 1114, 1115, 1116. The resulting interactions are tangential forces reacted by the slots 1138 of the reaction element 1139, which is also integral to the output shaft 1117. Each subset of interacting cams are capable of producing a specific speed conversion ratio that will dictate what speed the output shaft 1117 will ultimately rotate. That predetermined speed will be determined by one of the three outer cams 1114, 1115, 1116 that is successfully grounded to the housing 1154. Each outer cam 1114, 1115, 1116 is free to rotate in bearings 1118 until one of the grounding mechanisms 1149, disclosed in FIG. 17B, is activated thereby grounding the associated outer cam 1114, 1115, or 1116. There are any number of alternative grounding mechanisms (such as clutches or brakes) that may be suitable to perform the grounding function. The two remaining outer cams that are ungrounded and free to rotate will not participate in dictating the speed of the output shaft 1117 of this particular multi-input cam embodiment. Only one of the outer cams 1114, 1115, 1116 will be grounded at any one time and accordingly will determine that speed conversion ratio and in turn the speed of the output shaft 1117.

As illustrated in FIG. 17A, the output shaft 1117 of the 1st multi-input cam embodiment 1100 becomes the input shaft of a 2nd multi-input cam embodiment 1101, wherein one of the ratios is selected in like manner as in the 1st multi-input cam embodiment 1100 and its output shaft 1117. In turn, the output shaft (not shown) of 2nd multi-input cam embodiment 1101 becomes the input shaft to the 3rd multi-input cam embodiment 1101 and so on, and ultimately the input to the driven member 20. This final rotational speed conversion ratio output is determined by the product of the active ratio of each multi-input cam embodiments. The final output is the input to a differential 18R of the driving axles 19R as shown in FIG. 1A.

Figure 17C:
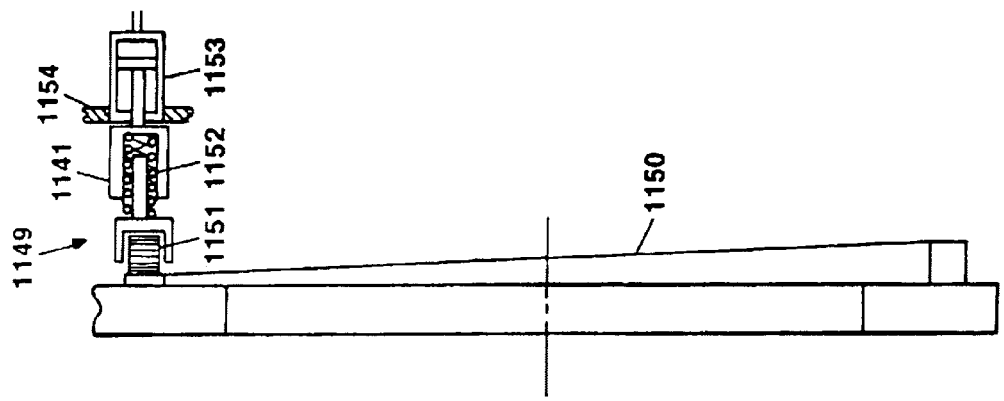
FIG. 17C is a schematic, sectional view of the outer cam and the grounding mechanism of FIG. 17A.
Figure 17B:
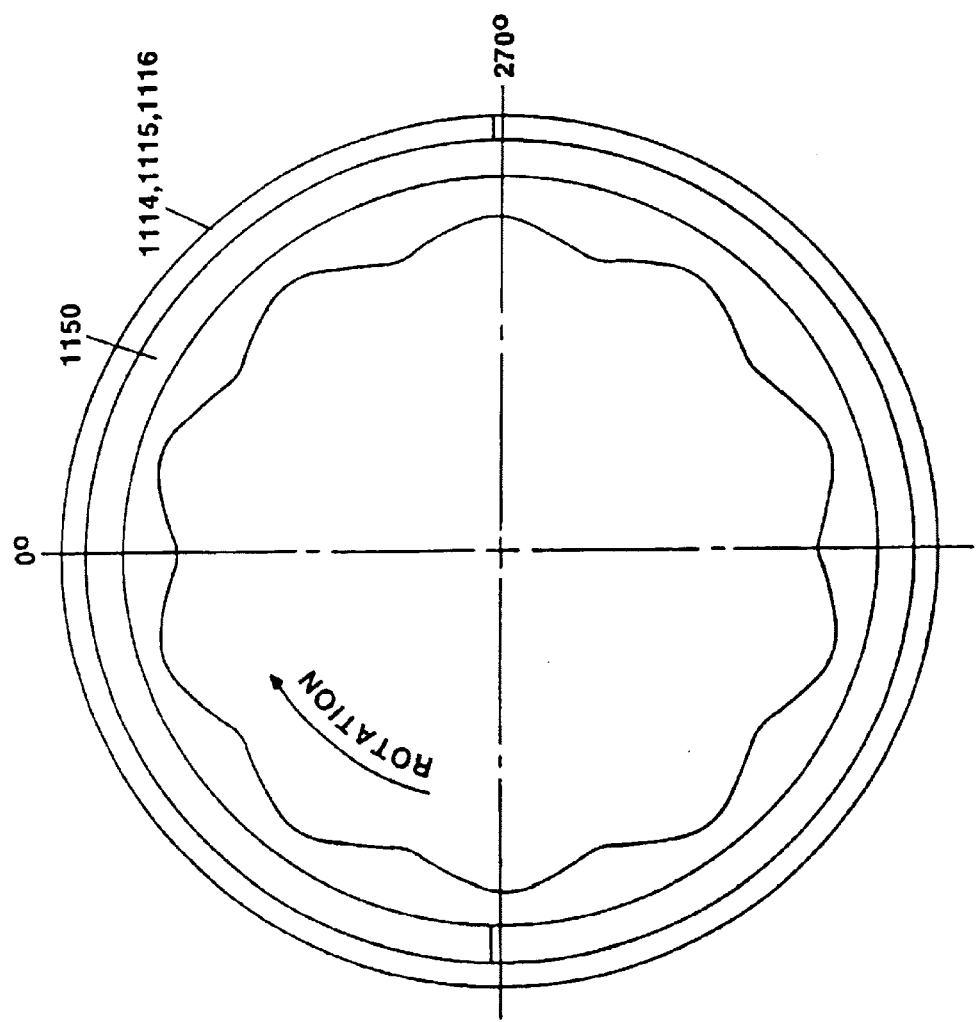
FIG. 17B is a planar view of the outer cam of the present invention illustrating the ramped cam track of the outer cam of FIG. 17A.

One approach to grounding the spinning outer cams 1114, 1115, 1116 described above includes an actuator 1141, a hydraulically-actuated roller 1151, a hydraulic cylinder 1153, and a 360° ramped cam track 1150 shown in FIGS. 17B and 17C. Roller 1151 is in constant contact with the ramped cam track 1150 as ramped cam track 1150 rotates due to the influence of the compression spring 1152. At the appropriate time the hydraulic cylinder 1153 is pressurized and the roller 1151 exerts additional normal force against the ramped cam track 1150. Linear advancement of hydraulic cylinder 1153, and therefore roller 1151, will ground to the housing 1154 meaning the associated outer cam 1114, 1115, or 1116 is stopped and held.

In grounding mechanism illustrate in FIGS. 17B–17C, the ramped cam track 1150 is shown starting at 0°, rises at a specific rate to its maximum height at 270° and decreases back to the neutral height at 0°. As shown in FIG. 17C, the rotation of the output ramped cam track 50 is such that starting from the 0° position the roller 1151 will be pushed into the compression spring 1152 for 270° rotation of the ramped cam track 1150 and then returned by the spring force for the remaining 90° to its original position. Thus, when the hydraulic cylinder 1153 is activated, the roller 1151 exerts additional normal force into the circular ramped cam track 1150 and holds a linear position such that the rising ramp will be jammed as roller 1151 cannot overcome the force of the hydraulic cylinder 1153. Consequently, the outer cam is grounded and that particular speed ratio will be active. Here again, the procedure does not limit other procedures from being applied such as electro-mechanical or even electromagnetic, or the configuration of the cam.

Other grounding configurations employing the basic principles of the above described, such as a fast acting cam type clutch, can perform the grounding function. The examples of the embodiment of this invention are not limited to the disclosed configurations of this clutching mechanism.

Figure 18:
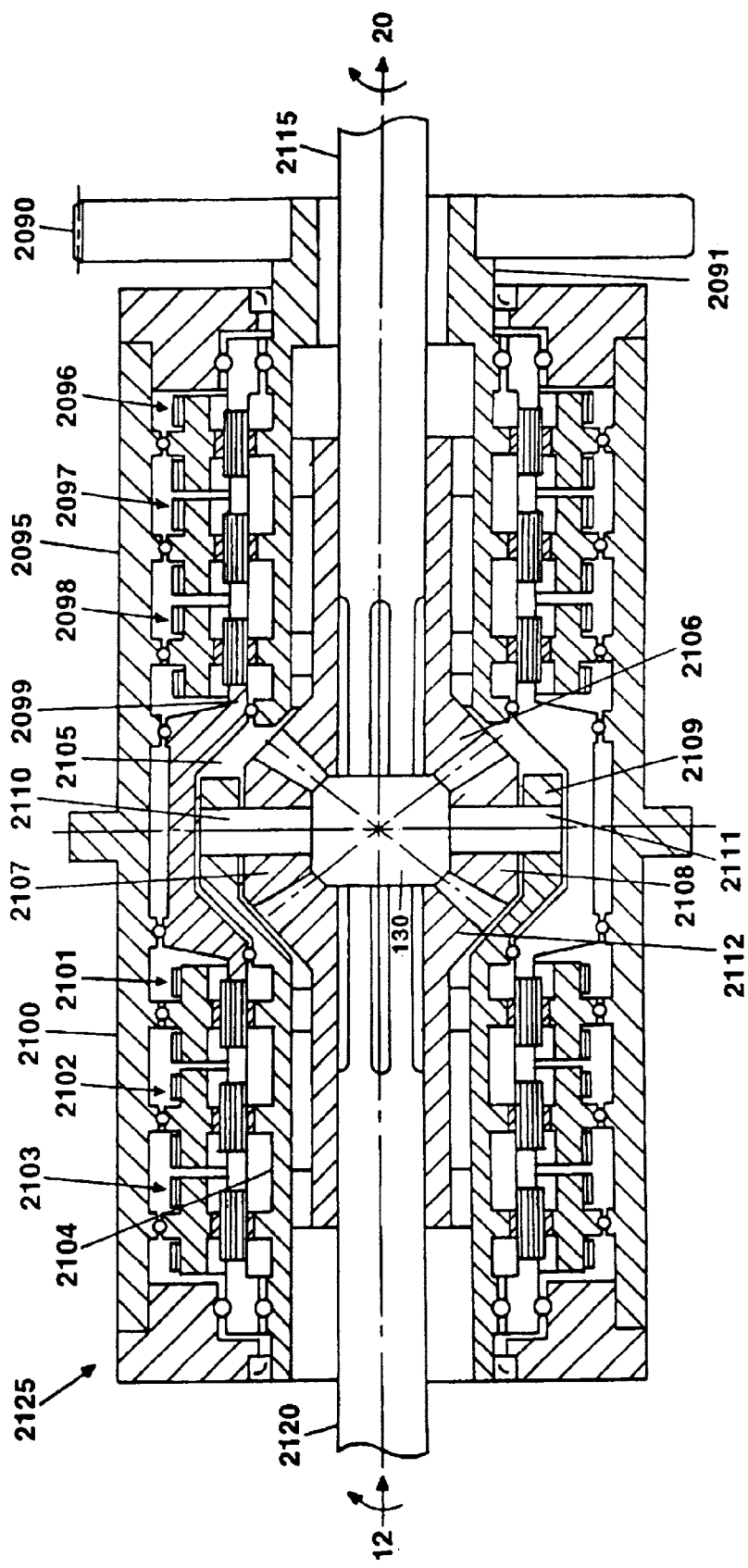
FIG. 18 is a sectional view of an exemplary transmission of the present invention having a multi-stage speed converter integrated with a conventional differential.

FIG. 18 illustrates a further transmission embodiment 2125 with a plurality of single stage multi-input cams integrated into a differential assembly. The input into the transmission 2125 is via a gear 2090 which mates with a gear on the output shaft of the fluid coupling (not shown). The gear 1090 is fixed to the input shaft 2091 of the 1st single stage multi-input cams 2095 comprising of single stage speed converters 2096, 2097, and 2098. The output reaction disk 2099 is the input shaft to the 2nd single stage multi-input cams 2100 and includes single stage speed converters 2101, 2102, and 2103. The input to the 2nd single stage multi-input cams 2100 being the reaction disk 2099, instead of the inner cam as in the embodiment of FIG. 11. Hydraulic cylinders (not shown) ground the outer cams in a similar fashion to those in FIG. 11. However, the inner cam/output shaft 2104 is the input to the differential or differential assembly 2130 since the single stage speed converters 2096, 2097, 2098, 2101, 2102 and 2103 are all back drivable.

The output shaft 2104 is directly coupled to the differential assembly 2130 and acts as the differential input shaft. The output shaft 2104 is configured such that a fork-like end 2109 is integrated at the end of the output shaft 2104. The output shaft 2104 will also include at least two transverse shafts 2110 and 2111 fixed in the fork ends 2109, of the output shaft 2104 that will support bevel spider gears 2107 and 2108. Also included in the differential design are two other bevel side gears 2106 and 2112 fixed to axles 2115 and 2120, respectively, thereby coupling the differential assembly 2130 to the driving wheels 14. As output shaft 2104 rotates, the forked ends 2109 rotate, transferring rotation to the shafts 2110 and 2111 that rotate at the same speed. The spider gears 2107 and 2108 rotate with shaft 2104, but do not rotate about their axes as long as the drive wheels are rotating at the same speed as is normally the case for straight vehicle travel. If the bevel side gears 2106 and 2112, which are connected to axles 2115 and 2120, are turning at the same speed, then the output shaft 2104 and axles 2115, 2120 are turning at the same speed and the differential is turning at the same speed as the input shaft 2104 and axles 2115 and 2120. If the two axles 2115, 2120 want to rotate at different speeds, as is normally the case for turning vehicle travel, then a speed differential is occurring and to avoid skidding the slower turning wheel, the spider gears 2107 and 2108 rotate about their axis and accommodate the differential speed requirements of the two axles 2115 and 2120. The two bevel side gears 2106 and 2112 are typically splined to drive the axles 2115 and 2120 of the drive wheels. The present invention 2125 includes the differential or differential assembly 2130 as part of the transmission.

Having such a multi-speed transmission offers many options for both the vehicle manufacturers and the operator. Computer control of each of the individual single stage speed converters facilitates selection by the operator or by computer program or by both. The ability to readily select any ratio stage is a necessary and significant function for the success of such a transmission.

Figure 19:
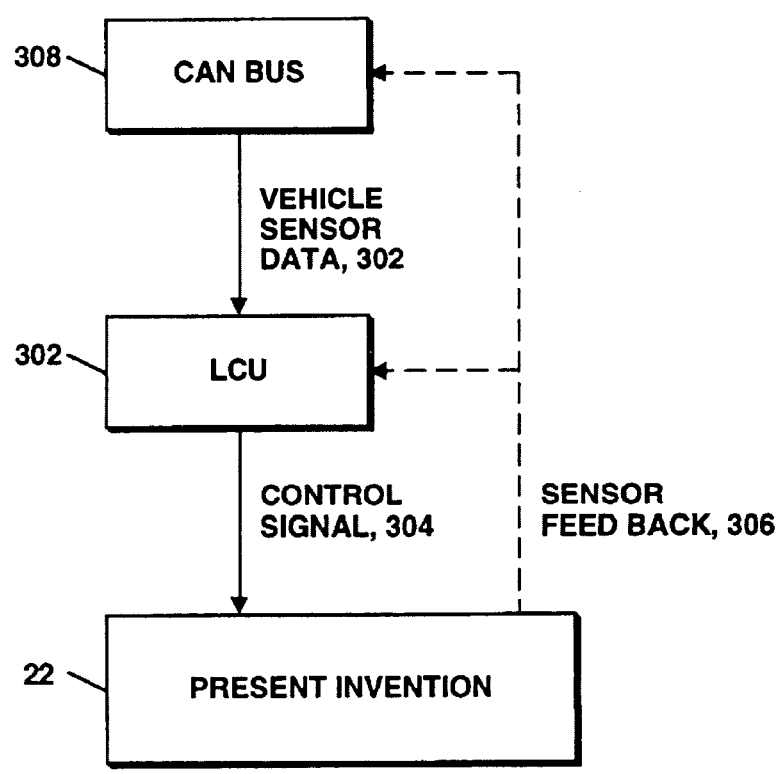
FIG. 19 is schematic of the computer logic control system of the present invention.

There are multiple methods of controlling any of the embodiments disclosed herein of the present invention 22 such as a control panel, a shifting mechanism, a paddle-type shifter, a program selectable automatic setting, and others. In a fully automated operation, the present invention 22 is controlled via a logic control unit (LCU) 300 through a network 308, for example a controller area network. Vehicle data 302 such as, accelerator or throttle position and rate, engine speed, wheel speed, multi-axis accelerometers, as well as specific feedback sensors 306 within the present invention 22 are inputted to the Logic Control Unit (LCU) 300 that processes the data and outputs the appropriate control signal(s) 304 to the present invention 22 actuator units that include clutches, friction brake, friction belts, or other suitable means to engage (ground) and disengage (un-ground) specific elements of the speed converter in the form of a module 24 or a transmission 26. The LCU 300 controls the present invention 22 functions such as ratio selection, shift sequence schedule and engagement and disengagement timing. FIG. 19 illustrates in schematic form the integration of the LCU 300 into the present invention 22 as described above.

It has been shown that the unique characteristics of the speed converter make possible alternative arrangements for multiple speed ratio transmissions either as a module operably connected to a conventional transmission or as a stand-alone transmission replacing a conventional transmission. The embodiments of the present invention described herein do not limit the design of speed converter modules or transmissions, but are merely some examples of how arrangements of speed converters, brakes and clutches, etc. can form any number of transmissions for automotive vehicles, trucks, busses, specialty vehicles, off-road vehicles and equipment, agricultural vehicles and equipment, and marine vessels and other applications requiring speed converted power transmission.

It will now be apparent to those skilled in the art that other embodiments, improvements, details, and uses can be made consistent with the letter and spirit of the foregoing disclosure and within the scope of this patent, which is limited only by the following claims, construed in accordance with the patent law, including the doctrine of equivalents.

What is claimed is:

1. A multi-speed ratio apparatus to control output comprising:
    a rotary speed converter having at least three rotatable components being operably connected together;
    a first component of said at least three rotatable components being an input part to said rotary speed converter, wherein said input part is operably connected to a driving member and said driving member comprises a vehicular transmission;
    a second component of said at least three rotatable components being an output part of said rotary speed converter, wherein said output part is operably connected to a drivable member;
    a third component of said at least three rotatable components being interposed within said first component and said second component to form a nested configuration of said at least three rotatable components;
    a grounding member being operably connected to a groundable component for selectively grounding said groundable component, wherein said groundable component is at least one of said at least three rotatable components; and
    said at least three rotatable components comprise an inner cam, a reaction disk, and an outer cam.

2. The apparatus as defined in claim 1, further comprising a housing.

3. The apparatus as defined in claim 2, wherein said groundable component of said at least one of said at least three rotatable components is grounded to said housing.

4. The apparatus as defined in claim 1, further comprising:
    a plurality of slots in said reaction disk; and
    a contact member selectively disposed within at least one of said plurality of slots.

5. The apparatus as defined in claim 4 wherein said contact member comprises a roller.

6. The apparatus as defined in claim 4, wherein said contact member comprises a bearing.

7. The apparatus as defined in claim 4, wherein said contact member comprises a roller device.

8. The apparatus as defined in claim 1, wherein:
    said input part is said inner cam;
    said output part is said reaction disk; and said groundable component of said at least one of said at least three rotatable components is said outer cam.

9. The apparatus as defined in claim 1, wherein:
said input part is said reaction disk;
said output part is said inner cam; and
said groundable component of said at least one of said at least three rotatable components is said outer cam.

10. The apparatus as defined in claim 1, wherein:
said input part is said outer cam;
said output part is said inner cam; and
said groundable component of said at least one of said at least three rotatable components is said reaction disk.

11. The apparatus as defined in claim 1, wherein:
said input part is said inner cam;
said output part is said outer cam; and
said groundable component of said at least one of said at least three rotatable components is said reaction disk.

12. The apparatus as defined in claim 1, wherein:
said input part is said reaction disk;
said output part is said outer cam; and
said groundable component of said at least one of said at least three rotatable components is said inner cam.

13. The apparatus as defined in claim 1, wherein:
said input part is said outer cam;
said output part is said reaction disk; and
said groundable component of said at least one of said at least three rotatable components is said inner cam.

14. The apparatus as defined in claim 8, wherein said inner cain and said outer cain form a conjugate pair.

15. The apparatus as defined in claim 9, wherein said inner cam and said outer cam form a conjugate pair.

16. The apparatus as defined in claim 10, wherein said inner cam and said outer cam form a conjugate pair.

17. The apparatus as defined in claim 11, wherein said inner cam and said outer cam form a conjugate pair.

18. The apparatus as defined in claim 12, wherein said inner cam and said outer cam form a conjugate pair.

19. The apparatus as defined in claim 13, wherein said inner cam and said outer cam form a conjugate pair.

20. The apparatus as defined in claim 1, wherein said drivable member is a vehicular axle.

21. The apparatus as defined in claim 1, wherein said drivable member is another rotary speed converter.

22. The apparatus as defined in claim 1, wherein said drivable member comprises a vehicular differential.

23. The apparatus as defined in claim 22, further comprising a housing, wherein said differential is contained in said housing.

24. The apparatus as defined in claim 1, wherein said apparatus is back drivable.

25. The apparatus as defined in claim 1, wherein said grounding member comprises a brake element.

26. The apparatus as defined in claim 1, wherein said grounding member comprises a clutch.

27. The apparatus as defined in claim 1, wherein said drivable member comprises a transfer case.

28. The apparatus as defined in claim 1, wherein said vehicular transmission is part of an all-wheel drive vehicle.

29. The apparatus of claim 8, wherein when said input part and said output part rotate clockwise, the speed ratio is 2.8 to 1.

30. The apparatus of claim 9, wherein when said input part and said output part rotate clockwise, the speed ratio is 0.36 to 1.

31. The apparatus of claim 10, wherein when said input part rotates clockwise and said output part rotates counterclockwise, the speed ratio is 0.56 to 1.

32. A The apparatus of claim 11, wherein when said input part rotates clockwise and said output part rotates counterclockwise, the speed ratio is 1.8 to 1.

33. The apparatus of claim 12, wherein when said input part and said output part rotate clockwise, the speed ratio is 0.64 to 1.

34. The apparatus of claim 13, wherein when said input part and said output part rotate clockwise, the speed ratio is 1.56 to 1.

35. A multi-speed ratio apparatus to control output comprising:
a rotary speed converter having at least three rotatable components being operably connected together;
a first component of said at least three rotatable components being an input part to said rotary speed converter, wherein said input part is operably connected to a driving member and said driving member comprises another rotary speed converter;
a second component of said at least three rotatable components being an output part of said rotary speed converter, wherein said output part is operably connected to a drivable member;
a third component of said at least three rotatable components being interposed within said first component and said second component to form a nested configuration of said at least three rotatable components;
a grounding member being operably connected to a groundable component for selectively grounding said groundable component, wherein said groundable component is at least one of said at least three rotatable components; and
said at least three rotatable components comprise an inner cam,
a reaction disk, and an outer cam.

36. A multi-speed ratio apparatus to control output comprising:
a rotary speed converter having at least three rotatable components being operably connected together;
a first component of said at least three rotatable components being an input part to said rotary speed converter, wherein said input part is operably connected to a driving member and said driving member comprises an engine;
a second component of said at least three rotatable components being an output part of said rotary speed converter, wherein said output part is operably connected to a drivable member;
a third component of said at least three rotatable components being interposed within said first component and said second component to form a nested configuration of said at least three rotatable components;
a grounding member being operably connected to a groundable component for selectively grounding said groundable component, wherein said groundable component is at least one of said at least three rotatable components; and
said at least three rotatable components comprise an inner cam,
a reaction disk, and an outer cam.

37. A speed converter for producing rotary motion of a shaft, comprising:

a housing;

a single stage rotary speed converter having a conjugate pair of cam parts and a reaction disk operably interconnected between said conjugate pair of cam parts, wherein said reaction disk is interposed within said conjugate pair of cam parts to form a nested configuration and said single stage rotary speed converter is contained within said housing;

a first part of said conjugate pair of cam parts comprising an inner cam and an input shaft, said inner cam being drivable by a driving member capable of producing a predetermined input rotary speed, wherein said driving member is a vehicular transmission;

a second part of said conjugate pair of cam parts comprising an outer cam;

said reaction disk including a plurality of slots and an output shaft, said reaction disk being capable of operably coupling said conjugate pair of cam parts, wherein said output shaft is capable of a predetermined output rotary speed and capable of driving a drivable member;

a contact member selectively disposed within at least one of said plurality of slots; and a grounding member operably connected to said outer cam and capable of selectively grounding said outer cam to said housing.

38. A speed converter for producing rotary motion of a shaft, comprising:

a housing;

a single stage rotary speed converter having a conjugate pair of cain parts and a reaction disk operably interconnected between said conjugate pair of cam parts, wherein said reaction disk is interposed within said conjugate pair of cam parts to form a nested configuration and said single stage rotary speed converter being contained within said housing;

a first part of said conjugate pair of cam parts comprising an inner cam and an output shaft, said output shaft capable of having a predetermined output rotary speed and further being capable of driving a drivable member;

a second part of said conjugate pair of cam parts being an outer cam;

said reaction disk including a plurality of slots and an input shaft, said reaction disk being capable of operably coupling said conjugate pair of cam parts, wherein said reaction disk is drivable by a driving member capable of producing a predetermined input rotary speed, wherein said driving member is a vehicular transmission;

a contact member selectively disposed within at least one of said plurality of slots; and a grounding member operably connected to said outer cam and capable of selectively grounding said outer cam to said housing.

39. A multi-ratio speed converter capable of being operably connected to a vehicular transmission, said multi-ratio speed converter comprising:

at least one single stage speed converter having an input cam, an output cain, a reaction disk, a contact member, and a grounding member operably connected to said outer cam capable of selectively grounding said outer cam, wherein said input cam, said output cam, said reaction disk, and said contact member are all located on a common axis and are operably interconnected to each other;

said at least one single stage speed converter is disposed between said vehicular transmission and a vehicular axle;

said input cam and said output cam form a conjugate pair and said reaction disk is interposed within said conjugate pair to form a nested configuration;

said reaction disk has a plurality of slots, each of said slots being capable of entraining said contact member therein;

said input cam is operably connected to the vehicular transmission; and said reaction disk is operably connected to the vehicular axle; and whereby a rotational speed applied to said at least one single stage speed converter by the transmission is capable of being converted to another rotational speed.

40. The converter as defined in claim 39, wherein said at least one single stage converter is capable of being set to a predetermined speed ratio.

41. The converter as defined in claim 39, further comprising a plurality of single stage speed converters, wherein each said single stage speed converter is operably connected to another single stage speed converter and disposed between the transmission and the axle.

* * * * *

UNITED STATES PATENT AND TRADEMARK OFFICE
CERTIFICATE OF CORRECTION

PATENT NO.         : 6,968,756 B2                                              Page 1 of 1
APPLICATION NO. : 10/687082
DATED              : November 29, 2005
INVENTOR(S)        : Frank A. Folino et al.

It is certified that error appears in the above-identified patent and that said Letters Patent is hereby corrected as shown below:

In Claim 14, column 21, line 31, "inner cain" should read -- inner cam--

In Claim 14, column 21, line 31, "outer cain" should read -- outer cam--

In Claim 38, column 23, line 34, "cain parts" should read -- cam parts --

In Claim 39, column 24, line 15, "output cain" should read -- output cam--

Signed and Sealed this

Twenty-first Day of August, 2007

JON W. DUDAS
*Director of the United States Patent and Trademark Office*